(12) United States Patent
Inomoto

(10) Patent No.: US 7,763,994 B2
(45) Date of Patent: Jul. 27, 2010

(54) POWER SOURCE SYSTEM

(75) Inventor: Tomoyuki Inomoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 11/794,918

(22) PCT Filed: Jan. 16, 2006

(86) PCT No.: PCT/JP2006/000911
§ 371 (c)(1),
(2), (4) Date: Jul. 9, 2007

(87) PCT Pub. No.: WO2006/080260
PCT Pub. Date: Aug. 3, 2006

(65) Prior Publication Data
US 2008/0094043 A1 Apr. 24, 2008

(30) Foreign Application Priority Data
Jan. 25, 2005 (JP) ............................. 2005-017383

(51) Int. Cl.
H02J 1/00 (2006.01)
H01M 6/42 (2006.01)
(52) U.S. Cl. .................. 307/75; 307/82; 429/7; 429/9; 429/156; 429/157; 429/159
(58) Field of Classification Search .................. 307/75, 307/82; 429/7, 9, 156–159
See application file for complete search history.

(56) References Cited
U.S. PATENT DOCUMENTS
4,502,152 A * 2/1985 Sinclair ....................... 455/73
5,083,078 A * 1/1992 Kubler et al. ............... 323/268
5,297,015 A * 3/1994 Miyazaki et al. ............ 363/146

(Continued)

FOREIGN PATENT DOCUMENTS
CN 1099753 1/2003

(Continued)

OTHER PUBLICATIONS

Chinese Office Action (along with the English language translation) issued Nov. 28, 2008 in the Chinese Application No. 200680003157.3

Primary Examiner—Albert W Paladini
Assistant Examiner—Hal I Kaplan
(74) Attorney, Agent, or Firm—Wenderoth, Lind & Ponack, L.L.P.

(57) ABSTRACT

A power source system (1) operable to supply a load circuit (10) with electrical power, including a power-supplying source (2) including a plurality of power source terminals (3) and (4) that differ in output voltage from one another, in which the power-supplying source is operable to supply the electrical power through the plurality of power source terminals (3) and (4), a power source terminal-selecting unit (5) operable to select either one of the plurality of power source terminals (3) and (4), a plurality of voltage converting units (6) and (7) connected to the power source terminal-selecting unit (5) and operable to convert electrical voltage, and a voltage converting unit-selecting unit (8) operable to select either one of the plurality of voltage converting units (6) and (7). The power source system provides the proper supply of the electrical power in accordance with a status of the load circuit (10).

18 Claims, 15 Drawing Sheets

U.S. PATENT DOCUMENTS

| | | | |
|---|---|---|---|
| 5,834,857 A | | 11/1998 | Abe et al. |
| 5,864,225 A | * | 1/1999 | Bryson .................... 323/268 |
| 6,130,525 A | * | 10/2000 | Jung et al. ................ 323/268 |
| 6,404,076 B1 | * | 6/2002 | Matsuda et al. ............. 307/80 |
| 6,424,128 B1 | * | 7/2002 | Hiraki et al. .............. 323/268 |
| 6,667,603 B2 | * | 12/2003 | Hiraki et al. .............. 323/268 |
| 6,737,839 B2 | * | 5/2004 | Hiraki et al. .............. 323/268 |
| 6,798,086 B2 | * | 9/2004 | Utsunomiya ............... 307/154 |
| 6,836,417 B2 | * | 12/2004 | Hiraki et al. .............. 323/268 |
| 7,051,216 B2 | * | 5/2006 | Suzuki et al. .............. 713/300 |
| 7,129,681 B2 | * | 10/2006 | Fujii ...................... 323/268 |
| 7,193,390 B2 | * | 3/2007 | Nagai et al. ............... 320/116 |
| 2003/0218894 A1 | | 11/2003 | Utsunomiya |
| 2004/0068670 A1 | | 4/2004 | Suzuki et al. |
| 2004/0174148 A1 | | 9/2004 | Hiraki et al. |

FOREIGN PATENT DOCUMENTS

| | | |
|---|---|---|
| CN | 1185780 | 1/2005 |
| EP | 0 409 226 | 1/1991 |
| EP | 949739 A2 * | 10/1999 |
| JP | 2004-88853 | 3/2004 |
| WO | 02/086678 | 10/2002 |

* cited by examiner

POWER SOURCE SYSTEM

TECHNICAL FIELD

The present invention relates to a power source system incorporated in a variety of electronic apparatuses.

BACKGROUND ART

An electronic apparatus including a handheld terminal such as a cellular phone and a PDA, and a notebook-sized personal computer is supplied with electrical power by a power source such as a battery in order to ensure the portability of the electronic apparatus. Although a rechargeable battery is in widespread use as the power source, a fuel cell such as a polymer electrolyte fuel cell will be substituted therefor in near future.

The current trend is that the electronic apparatus is provided with a variety of extended functions, resulting in increase in required electrical power. Meanwhile, the electronic apparatus must consume reduced electrical power to ensure operating time of the electronic apparatus. These two conflicting issues of the electronic apparatus, i.e., improved electronic apparatus functions and reduced power consumption, must be smoothed out.

To achieve less power consumption in the electronic apparatus, a power source system having proper control of the electrical power to be supplied is disclosed by cited Reference No. 1 or published Japanese Patent Application Laid-Open No. 2004-88853.

FIG. 16 is a block diagram illustrating a power source system disclosed in cited Reference No. 1.

The power source system 100, which is operable to supply a load circuit 106 with the electrical power, includes elements as discussed below. A power-supplying source 101 such as a rechargeable battery is an electrical power supplier. The load circuit 106 includes all electronic circuits that must be supplied with the electrical power, such as various electronic components, IC's, and a display panel, each of which actuates the electronic apparatus. The power-supplying source 101 includes a power source terminal 102 connected to both a switching regulator 103 and a series regulator 104. A control unit 105 is operable to select either the switching regular 103 or the series regulator 104 to use the selected regulator. The load circuit 106 is supplied with the electrical power through the output from the selected regulator.

Although the power-supplying source 101 has a certain output voltage, the load circuit 106 has an operating voltage often varying in dependence upon the circuit structure and electronic components, and the output voltage of the power-supplying source 101 must be lowered to supply the load circuit with the electrical power. To this end, the switching regulator 103 and series regulator 104 are provided for lowering the voltage.

As illustrated in FIG. 17, the switching regulator 103 differs in efficiency characteristics from the series regulator 104 relative to consumption current. FIG. 17 is an illustration showing the efficiency characteristics of each of the switching regulator and the series regulator.

Referring to FIG. 17, according to the efficiency characteristics of the switching regulator 103, the efficiency is shown on the increase with an increase in consumption current in the range of a smaller consumption current, but is shown saturated when the consumption current is equal to or greater than a predetermined value. With continued reference to FIG. 17, according to the efficiency characteristics of the series regulator 104, the efficiency is shown remaining unchanged relative to a definite value regardless of variations in consumption current. In consideration of such efficiency characteristics, the series regulator 104 is selected when a smaller consumption current flows in the load circuit 106, but the switching regulator 103 is selected for a certain or greater consumption current. Such a switchover supplies the load circuit 106 with the electrical power in response to variations in consumption current.

However, increased consumption current in the load circuit 106 reduces the output voltage of the power source terminal 102. To be specific, the increased consumption current in the load circuit 106 results in a drop in voltage, thereby reducing the output voltage of the power source terminal 102. The reduced output voltage brings about a problem of malfunction of the load circuit 106. In particular, when the power-supplying source 101 is a fuel cell, a much greater reduction in voltage occurs.

Alternatively, assume that the power-supplying source 101 includes a margin for the reduction in output voltage. However, as a result of the alternative, a higher voltage is objectionably supplied to the load circuit 106 although the load circuit 106 requires a smaller consumption current, with a consequential increase in unwanted power consumption. In addition, a difference between input and output voltages of each of the switching regulator 103 and the series regulator 104 is increased, thereby increasing a voltage amount required to lower the voltage in each of the switching regulator 103 and the series regulator 104. This causes another problem of increased loss of power consumption in each of the switching regulator 103 and the series regulator 104 as well as that in the load circuit 106.

In conclusion, the prior art power source system has problems as discussed below.

One of the problems is that the inability of the proper supply of the electrical power to the load circuit 106 results in increased power consumption. The increased, unwanted power consumption brings about another problem of reduced operating time of an electronic apparatus.

A further problem is that the power reduction-caused malfunction of the load circuit results in reduced reliability of the electronic apparatus in terms of electronic apparatus activities.

DISCLOSURE OF THE INVENTION

In view of the above, an object of the present invention is to provide a power source system operable to supply a load circuit of an electronic apparatus with electrical power having a proper voltage in response to variations in consumption current in the load circuit, thereby preventing the occurrence of the malfunction of the load circuit, and operable to provide a longer period of operating time of the electronic apparatus, by reducing unwanted power consumption in the power source system.

A first aspect of the present invention provides a power source system operable to supply a load circuit with electrical power, including: a power-supplying source including a plurality of power source terminals that differ in output voltage from each other, in which the power-supplying source is operable to supply the electrical power through the plurality of power source terminals; a power source terminal-selecting unit operable to select either one of the plurality of power source terminals; a plurality of voltage converting units connected to the power source terminal-selecting unit, in which the plurality of voltage converting units is operable to convert electrical voltage; and a voltage converting unit-selecting unit operable to select either one of the plurality of voltage converting units.

The above structure provides a variety of power-supplying channels formed by each combination of either one of the power source terminals and either one of the voltage converting units, thereby making it feasible to supply the load circuit with electrical power to properly meet variations in electrical power required by the load circuit. The variation-based supply of the electrical power prevents malfunction of the load circuit, which otherwise would occurs as a result of a drop in voltage, and provides reduced unwanted power consumption in the power source system.

A second aspect of the present invention provides a power source system, further including a control unit operable to control a selection to be made by each of the power source terminal-selecting unit and the voltage converting unit-selecting unit.

The above structure makes an easy selection of either one of the power source terminals and either one of the voltage converting units.

A third aspect of the present invention as defined in the second aspect provides a power source system in which the control unit includes a consumption current-measuring unit operable to measure consumption current in the load circuit, thereby providing a measurement result, and based on the measurement result, the control unit exercises control over a selection to be made by each of the power source terminal-selecting unit and the voltage converting unit-selecting unit.

The above structure measures the consumption current in the load circuit in real time, and determines variations in required electrical power based on variations in consumption current, whereby optimum power-supplying channels to cope with the variations in required power are formed. As a result, the power supply system supplies the electrical power based on a properly recognized status of the load circuit, thereby preventing malfunction of the load circuit and providing reduced unwanted power consumption in the power source system.

A fourth aspect of the present invention as defined in the second aspect provides a power source system in which the control unit includes an activity-recognizing unit operable to recognize a type of each activity of the load circuit, thereby providing a recognized activity type, and based on the recognized activity type, the control unit exercises control over a selection to be made by each of the power source terminal-selecting unit and the voltage converting unit-selecting unit.

The above structure facilitates estimating the required electrical power of the load circuit in accordance with a recognized type of each activity of the load circuit.

A fifth aspect of the present invention as defined in the fourth aspect provides a power source system in which the activity-recognizing unit includes an input-receiving unit operable to receive activity input, thereby providing a result from the receipt of the activity input, and based on the result from the receipt of the activity input, the control unit exercises control over a selection to be made by each of the power source terminal-selecting unit and the voltage converting unit-selecting unit.

The above structure facilitates recognizing types of activities of the load circuit without fail.

A sixth aspect of the present invention as defined in the first aspect provides a power source system in which the power-supplying source includes a rechargeable battery.

The above structure realizes an optimum power source system for use in portable electronic apparatuses such as a handheld terminal and a notebook-sized personal computer.

A seventh aspect of the present invention as defined in the first aspect provides a power source system in which the power-supplying source includes a fuel cell.

The above structure realizes an optimum power source system for use in recharge-free, portable electronic apparatuses.

An eighth aspect of the present invention as defined in the first aspect provides a power source system in which the power-supplying source includes a plurality of internal power source cells serially connected together, and the plurality of power source terminals are connected to the plurality of internal power source cells at different connections thereof.

The above structure readily forms a plurality of power source terminals having different voltage values.

A ninth aspect of the present invention as defined in the eighth aspect provides a power source system in which the plurality of internal power source cells includes an internal power source cell connected to the higher voltage side of the power-supplying source, and an internal power source cell connected to the lower voltage side of the power-supplying source, and the internal power source cell connected to the higher voltage side is smaller in size than that connected to the lower voltage side.

The above structure provides a downsized power-supplying source without changes in rated voltage and rated current of the power-supplying source. As a result, there is provided a downsized power source system operable to supply the load circuit with the electrical power in accordance with variations in required electrical power of the load circuit.

A tenth aspect of the present invention as defined in the first aspect provides a power source system in which the plurality of voltage converting units includes a plurality of step-down voltage converting units. Each of the plurality of step-down voltage converting units is operable to lower output voltage relative to input voltage. The plurality of step-down voltage converting units is different in efficiency characteristics from each other relative to the consumption current.

The above structure supplies the electrical power from the power-supplying source to the load circuit in accordance with different voltages required by the load circuit.

An eleventh aspect of the present invention as defined in the tenth aspect provides a power source system in which the plurality of step-down voltage converting units includes one step-down voltage converting unit having efficiency characteristics dependent upon the consumption current, and another step-down voltage converting unit having efficiency characteristics independent of the consumption current.

The above structure provides a variety of power-supplying channels, thereby flexibly supplying the electrical power to the load circuit in response to a varying change in required electrical power of the load circuit. As a result, reduced power consumption in the power source system as well as improved reliability of the electronic apparatus is achievable.

A twelfth aspect of the present invention as defined in the tenth aspect provides a power source system in which the plurality of step-down voltage converting units includes a switching regulator and a series regulator.

The above structure selects a regulator having better efficiency characteristics in response to variations in value of the consumption current, thereby making it feasible to properly supply the load circuit with the electrical power in accordance with the required power of the load circuit.

A thirteenth aspect of the present invention as defined in the tenth aspect provides a power source system in which the plurality of step-down voltage converting units includes a switching regulator and a linear regulator.

The above structure selects a regulator having better efficiency characteristics in response to variations in value of the consumption current, thereby making it feasible to properly supply the load circuit with the electrical power in accordance with the required power of the load circuit.

A fourteenth aspect of the present invention provides a power source system operable to supply a load circuit with electrical power, including: a power-supplying source including a first power source terminal and a second power source terminal, in which the first power source terminal is different in output voltage from the second power source terminal, and the power-supplying source is operable to supply the electrical power through the first power source terminal and the second power source terminal; a power source terminal-selecting unit operable to select either the first power source terminal or the second power source terminal; a switching regulator and a series regulator, both of which are connected to the power source terminal-selecting unit; and a voltage converting unit-selecting unit operable to select either the switching regulator or the series regulator. In the power source system, the first power source terminal is higher in output voltage than the second power source terminal.

The above structure provides a plurality of power-supplying channels formed by a variety of combinations of the power source terminals having different output voltages and the regulators having different efficiency characteristics, in response to variations in required electrical power of the load circuit. The power-supplying channels allow for the required power-based supply of the electrical power, whereby the electronic apparatus is operated in a longer period of time with improved reliability of the electronic apparatus in terms of electronic apparatus activities.

A fifteenth aspect of the present invention as defined in the fourteenth aspect provides a power source system, further including a control unit operable to control a selection to be made by each of the power source terminal-selecting unit and the voltage converting unit-selecting unit.

The above structure facilitates a selection of the required power source terminal and voltage converting unit.

A sixteenth aspect of the present invention as defined in the fifteenth aspect provides a power source system in which the control unit includes a consumption current-measuring unit operable to measure consumption current in the load circuit, thereby providing a result from the measurement of the consumption current. In the power source system, when the result from the measurement of the consumption current is less than a first current value, the control unit sends out one control signal to the power source terminal-selecting unit to select the second power source terminal, and another control signal to the voltage converting unit-selecting unit to select the series regulator; when the result from the measurement of the consumption current is equal to or greater than the first current value, but is smaller than a second current value, the control unit sends out one control signal to the power source terminal-selecting unit to select the first power source terminal, and another control signal to the voltage converting unit-selecting unit to select the series regulator; when the result from the measurement of the consumption current is equal to or greater than the second current value, the control unit sends out one control signal to the power source terminal-selecting unit to select the first power source terminal, and another control signal to the voltage converting unit-selecting unit to select the switching regulator.

The above structure measures variations in consumption current in the load circuit in real time, and, according to a result from the measurement, provides each proper combination of either one of the power source terminals having different output voltages and either one of the regulators having different efficiency characteristics. As a result, the supply of the electrical power based on variations in consumption current is achievable.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3($b$) is a block diagram illustrating the interior of another power-supplying source according to the first embodiment;

BEST MODE FOR CARRYING OUT THE INVENTION

Embodiments of the present invention are now described with reference to the accompanying drawings.

First Embodiment

Figure 1:
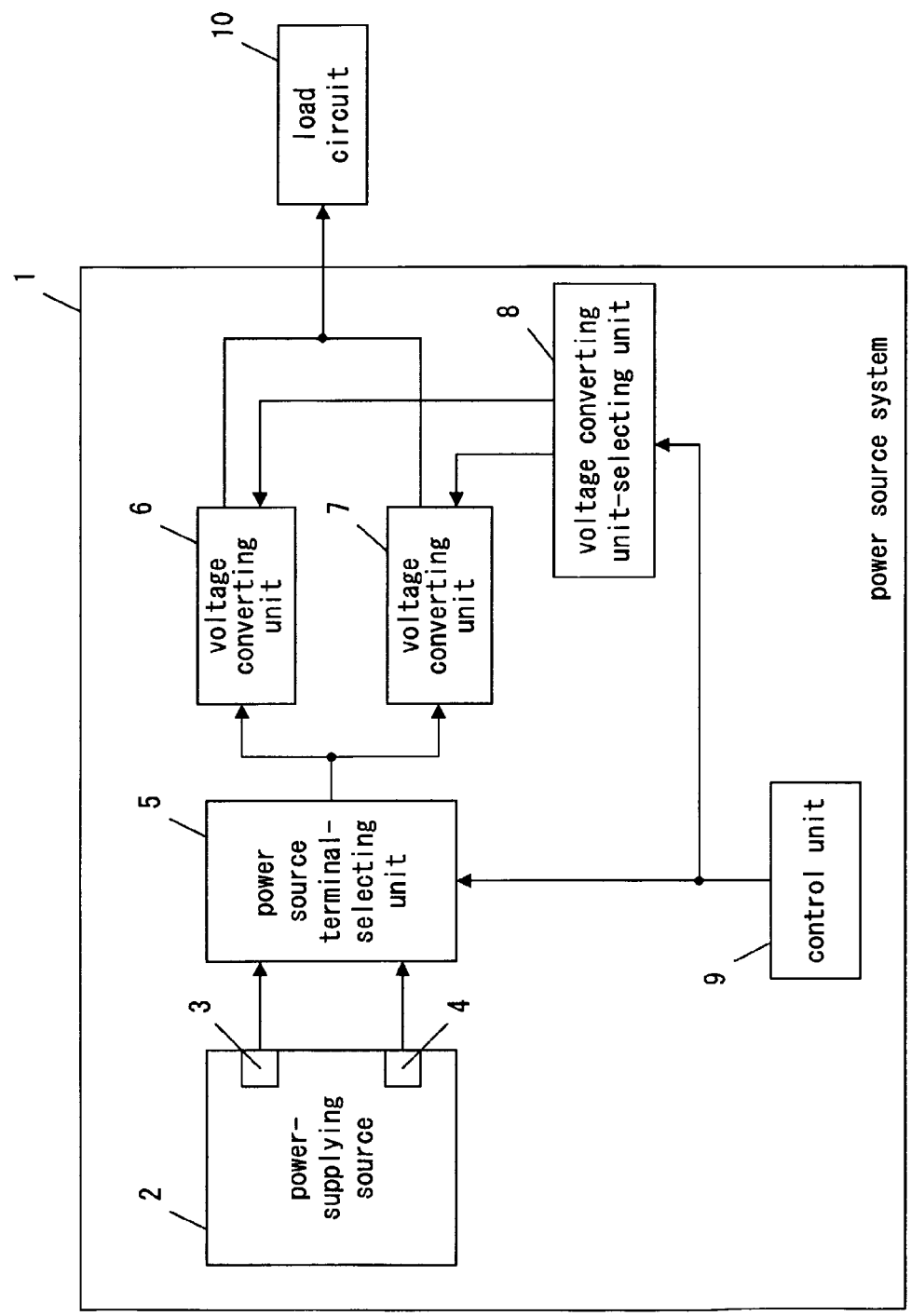
FIG. 1 is a block diagram illustrating a power source system according to a first embodiment of the present invention.

FIG. 1 is a block diagram illustrating a power source system according to a first embodiment of the present invention.

The power source system 1 is disposed in a variety of electronic apparatuses. The electronic apparatuses are those requiring portability thereof, such as a cellular phone, a PDA, and a notebook-sized personal computer.

The following discusses the entire construction of the power source system 1 according to the first embodiment.

The power source system 1 is operable to supply electrical power to a load circuit 10 that allows the electronic apparatus to function. The power source system 1 includes elements as discussed below.

A power-supplying source 2 is operable to supply the load circuit 10 with the electrical power. The power-supplying source 2 employs a battery. To secure the portability of the electronic apparatus, a rechargeable battery and a recharge-free fuel cell are used. The power-supplying source 2 includes plural power source terminals 3 and 4. The power source terminal 3 differs in output voltage from the power source terminal 4.

The power source terminals 3, 4 are connected to a power source terminal-selecting unit 5 operable to select either one of the power source terminals 3, 4 under the control of a control unit 9. The power-supplying source 2 supplies plural voltage converting units 6, 7 with the electrical power through the selected one of the power source terminals 3, 4. The plural voltage converting units 6, 7 are connected to the power source terminal-selecting unit 5 at an output terminal thereof. Each of the voltage converting units 6, 7 is operable to convert input voltage, thereby feeding the converted input voltage into the load circuit 10. At this time, a voltage converting unit-selecting unit 8 selects either one of the voltage converting units 6, 7 under the control of the control unit 9. The control unit 9 has control of a selection to be made by each of the power source terminal-selecting unit 5 and the voltage converting unit-selecting unit 8. The voltage converting unit 6 differs in efficiency characteristics from the voltage converting unit 7.

The power source terminal-selecting unit 5 and voltage converting unit-selecting unit 8 determine each combination of either one of the power source terminals 3, 4 having different output voltages, and either one of the voltage converting units 6, 7 having different efficiency characteristics. The determined combinations form power-supplying channels that differ in power characteristics from each other.

To permit the electronic apparatus to function, the load circuit 10 includes a variety of elements, to which the electrical power must be supplied, such as electronic components, a printed circuit board, a network, an integrated circuit such as an IC and a LSI, a display panel, and an input device.

The following discusses details of each component of the power source system.

The power-supplying source 2 and the power source terminals 3, 4 are now described.

The power-supplying source 2 includes the plural power source terminals 3, 4. A rechargeable battery or otherwise a fuel cell is used as the power-supplying source 2 to allow the power-supplying source 2 to be desirably used in electronic apparatuses such as a handheld terminal and a notebook-sized personal computer. The power source terminals 3, 4 differ in output voltage from one another.

Figure 3A:
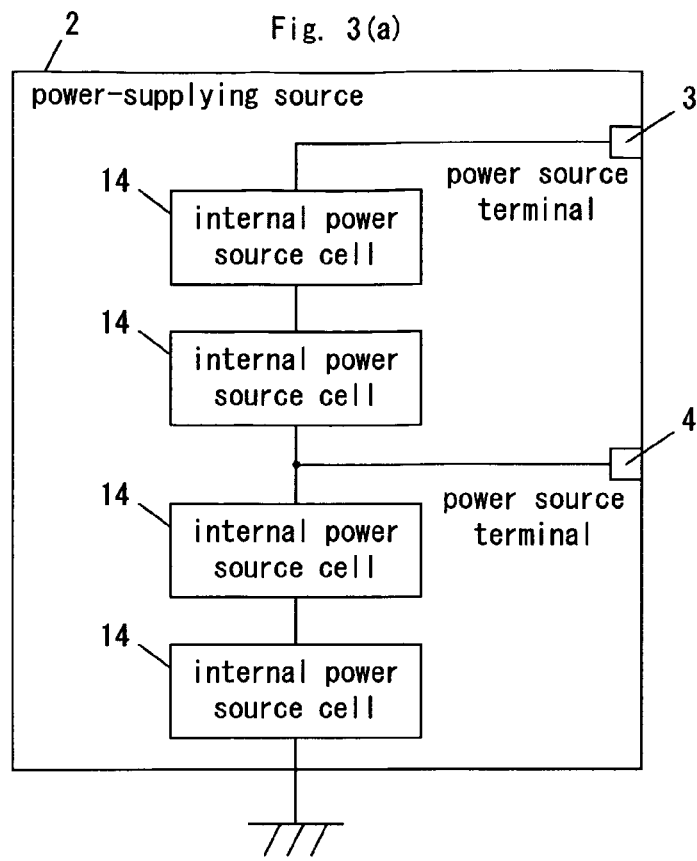
FIG. 3($a$) is a block diagram illustrating the interior of one power-supplying source according to the first embodiment.
Figure 3B:
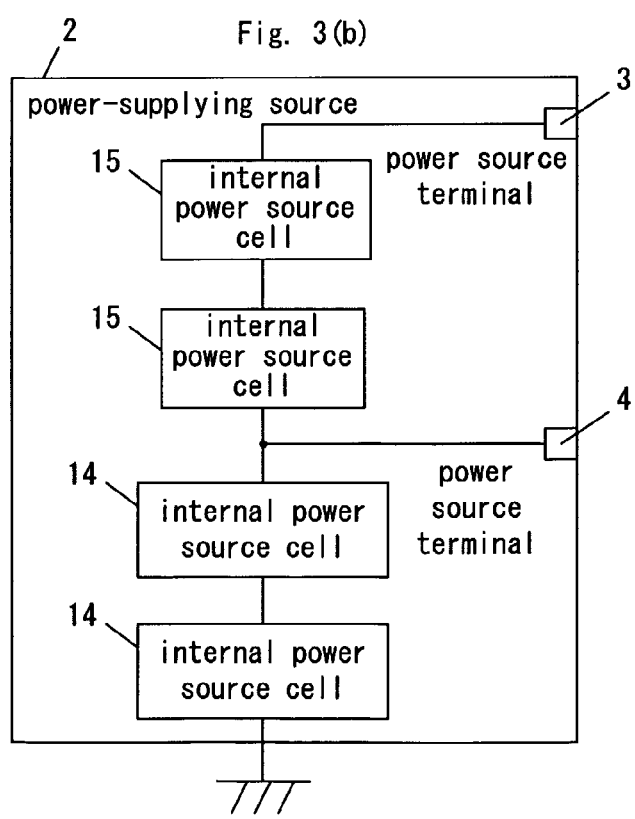

Structures as illustrated in FIGS. 3(a) and 3(b) allow the power source terminals 3, 4 to have different output voltages. Each of FIGS. 3(a) and 3(b) is a block diagram illustrating the interior of the power-supplying source 2 according to the present embodiment.

As illustrated in FIG. 3(a), the power-supplying source 2 includes a plurality of internal power source cells 14 serially connected together. Each of the internal power source cells 14 has a certain output voltage. The serially interconnected internal power source cells 14 form the power-supplying source 2 having a predetermined output voltage. The power source terminals 3, 4 are connected to the serially interconnected internal power source cells 14 at different connections thereof. As illustrated in FIG. 3(a), the power source terminal 3 is connected to the head of the serially interconnected internal power source cells 14 at an output point thereof, while the power source terminal 4 is connected to intermediate one of the serially interconnected power source cells 14 at an output point thereof. As a result, the power source terminal 3 is higher in output voltage than the power source terminal 4.

Each of the internal power source cells 14 positioned on the higher voltage side is required to provide a smaller output current than that required for each of the internal power source cells 14 located on the lower voltage side. This is because the required output current of each of the internal power source cells 14 on the lower voltage side is a total of output currents of the power source terminals 3, 4, while the required output current of each of the internal power source cells 14 on the higher voltage side may be only an output current of the power source terminal 3. Consequently, the internal power source cells 14 on the higher voltage side may be made smaller in size than those on the lower voltage side.

As demonstrated in FIG. 3(b), internal power source cells 15 located on the higher voltage side can be made smaller in size than the internal power source cells 14 on the lower voltage side, whereby the downsized power-supplying source 2 is available.

Figure 2:
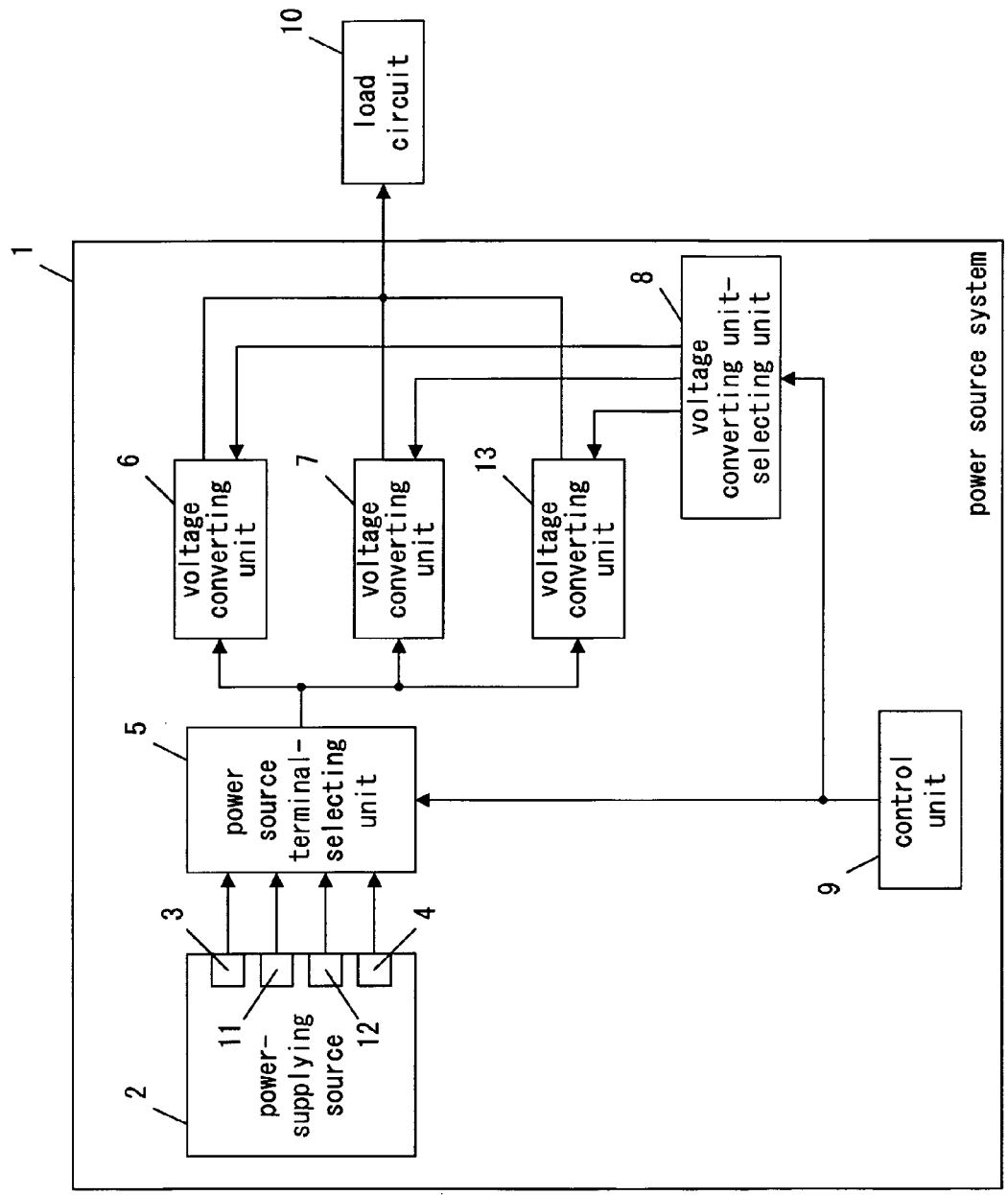
FIG. 2 is a block diagram illustrating another power source system according to the first embodiment.

The following discusses the voltage converting units 6, 7, shown in FIG. 2.

The voltage converting units 6, 7 are operable to convert the voltage of the electrical power supplied by the power-supplying source 2. This is because the power-supplying source 2 has a certain output voltage, while the load circuit 10 requires a variable voltage.

Figure 4:
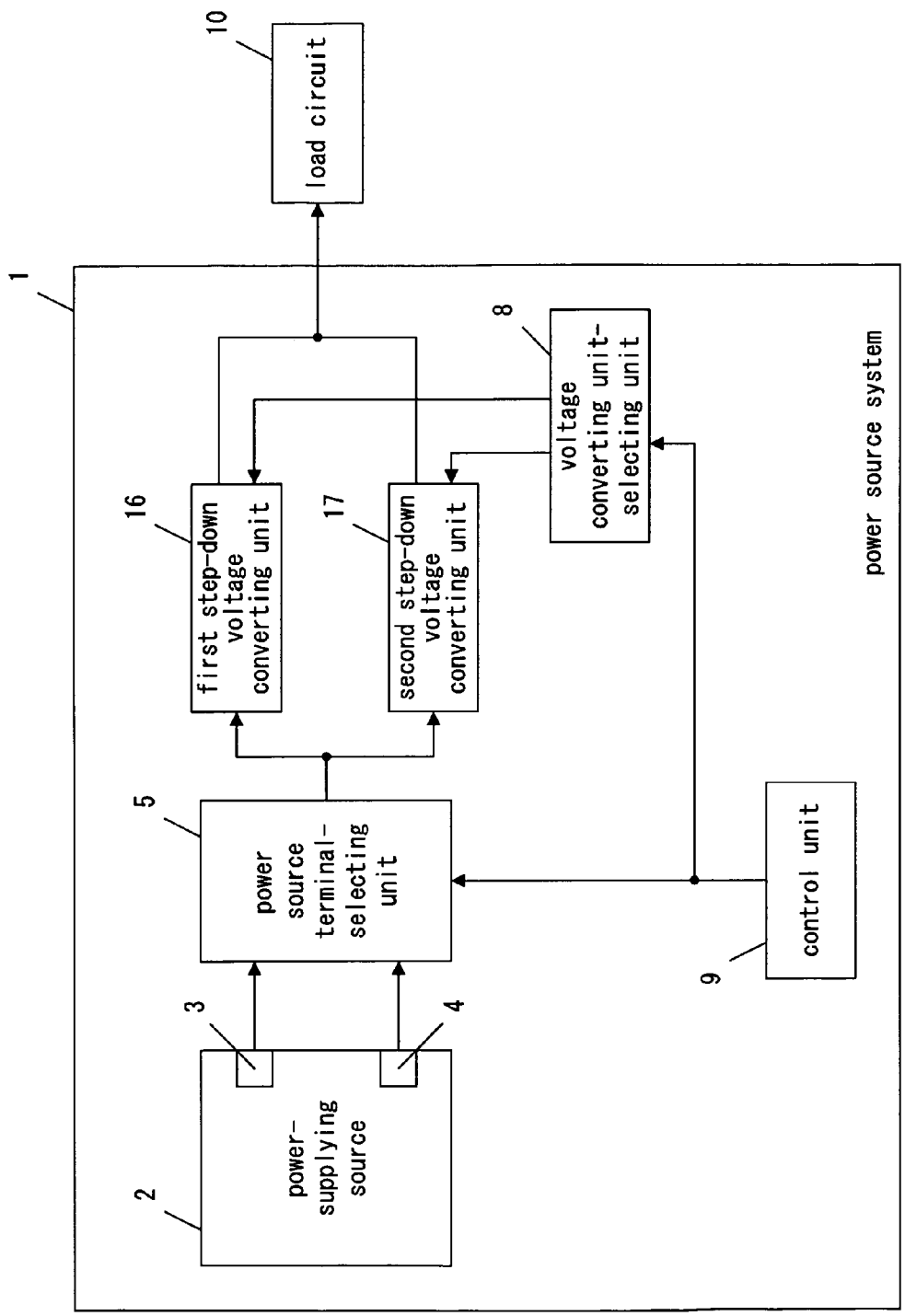
FIG. 4 is a block diagram illustrating a power source system according to the first embodiment.

FIG. 4 is a block diagram illustrating the power source system according to the present embodiment.

The power source system 1 shown in FIG. 4 possesses first and second step-down voltage converting units 16, 17, which correspond to the voltage converting units 6, 7 shown in FIG. 2, respectively.

As illustrated in FIG. 4, first and second step-down voltage converting units 16, 17 operable to lower the output voltage relative to input voltage are used as the voltage converting units. Each of the first and second step-down voltage converting units thus used has different efficiency characteristics. The first and second step-down voltage converting units 16, 17 of FIG. 4 differ in efficiency characteristics from one another relative to the consumption current. The use of the first and second step-down voltage converting units 16, 17 having different efficiency characteristics allows for the supply of the electrical power in response to variations in consumption current in the load circuit 10.

Figure 5:
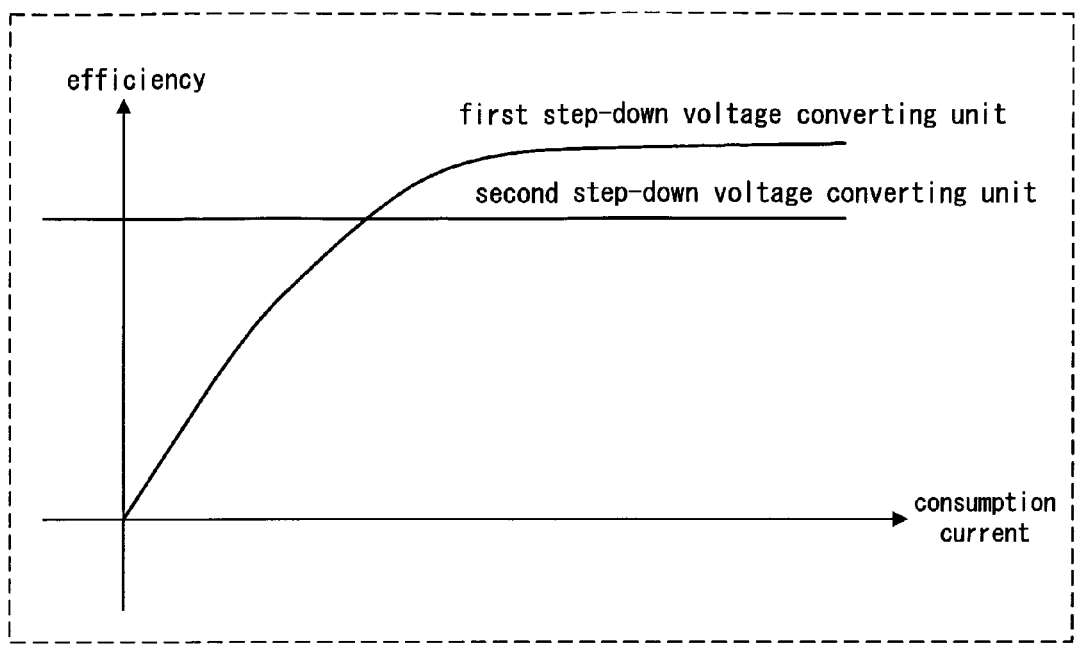
FIG. 5 is an illustration showing efficiency characteristics of each of first and second step-down voltage converting units according to the first embodiment.

FIG. 5 is an illustration showing the efficiency characteristics of each of the first and second step-down voltage converting units 16, 17 according to the present embodiment. According to the efficiency characteristics of the first step-down voltage converting unit 16, when the consumption current is less than a predetermined value, the efficiency increases with an increase in consumption current, but is saturated in the range in which the consumption current is equal to or greater than the predetermined value. According to the efficiency characteristics of the second step-down voltage converting unit 17, the efficiency has a definite value without regard to variations in consumption current. A switching regulator is used as a step-down voltage converting unit having the efficiency characteristics of the first step-down voltage converting unit 16. A series regulator or otherwise linear regulator is used as a step-down voltage converting unit having the efficiency characteristics of the second step-down voltage converting unit 17.

Figure 6:
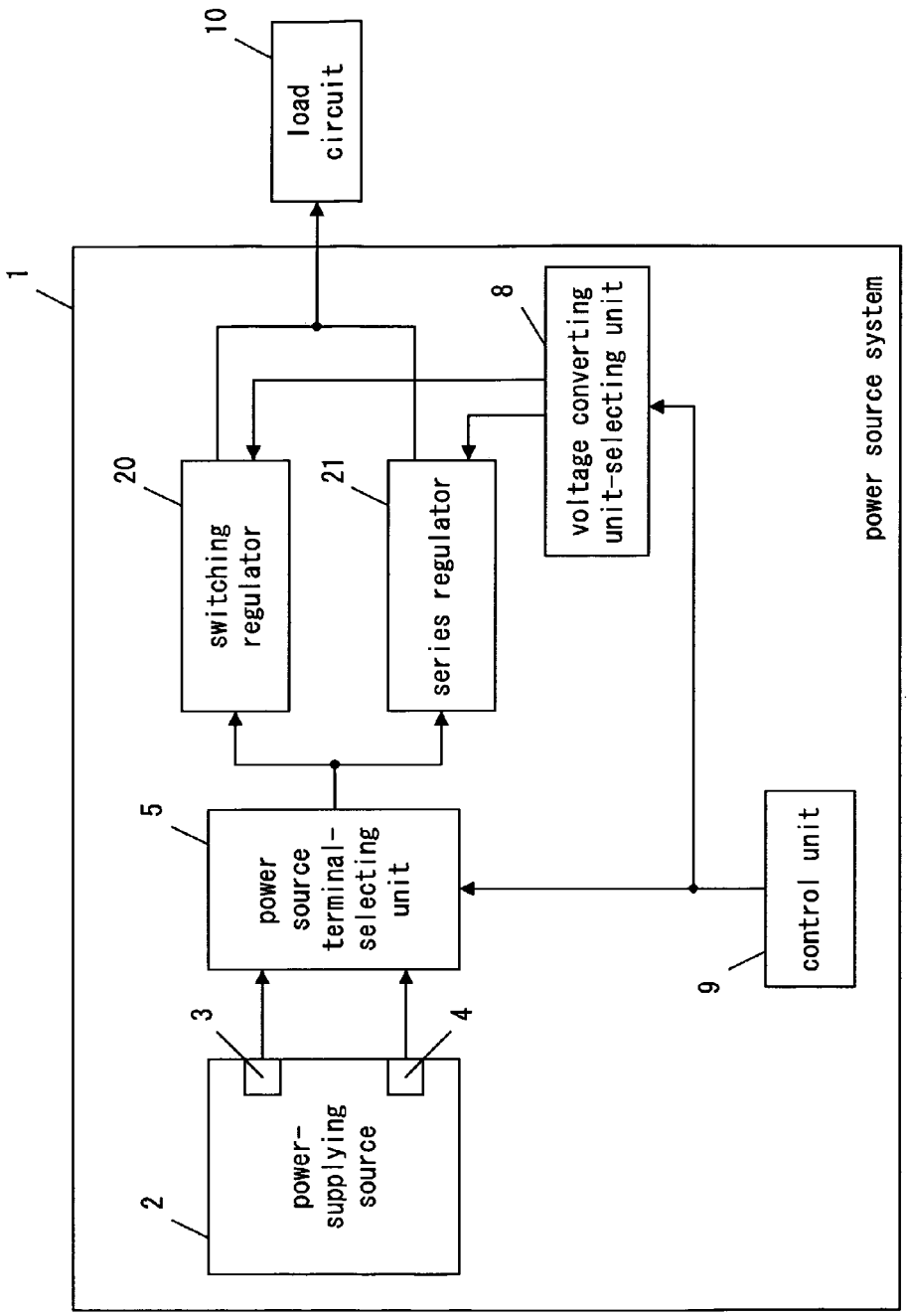
FIG. 6 is a block diagram illustrating a further power source system according to the first embodiment.
Figure 7:
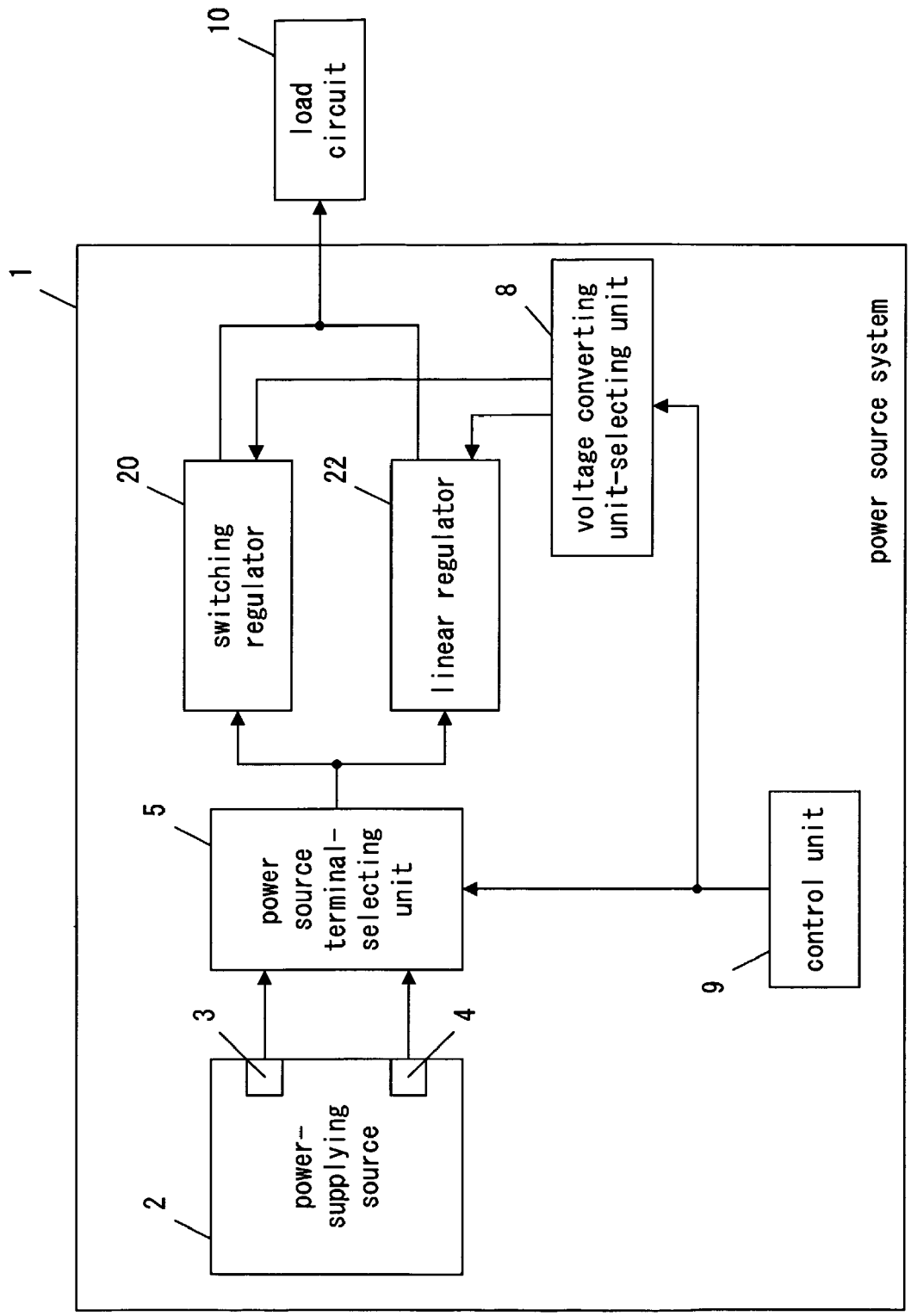
FIG. 7 is a block diagram illustrating a yet further power source system according to the first embodiment.

Each of FIGS. 6 and 7 is a block diagram illustrating a further power source system according to the present embodiment. FIG. 6 illustrates one structure including the switching regulator 20 and the series regulator 21. FIG. 7 illustrates another structure including the switching regulator 20 and the linear regulator 22.

Figure 8:
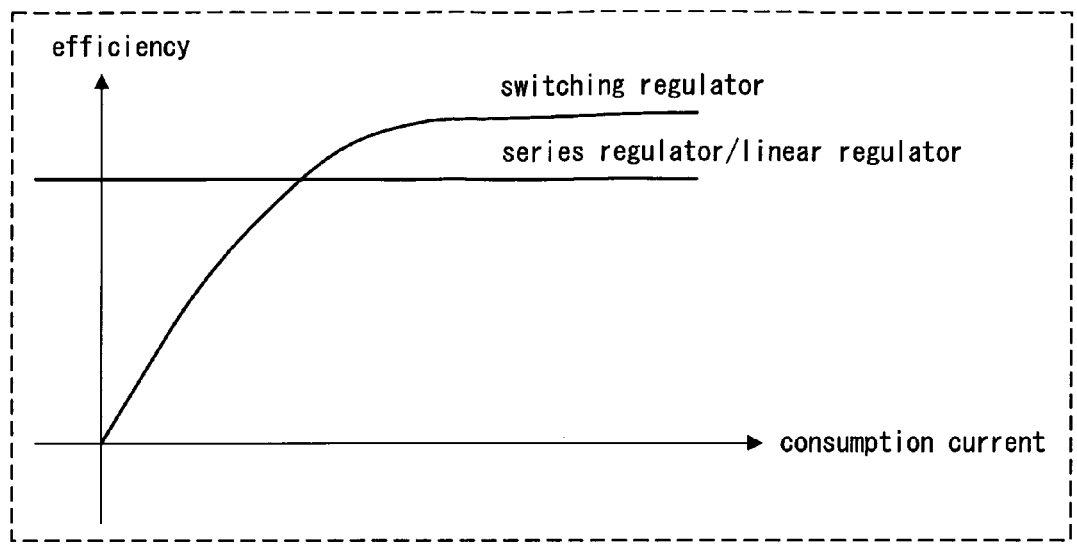
FIG. 8 is an illustration showing efficiency characteristics of each of a switching regulator and a series regulator according to the first embodiment.

FIG. 8 is an illustration showing efficiency characteristics of each of the switching regulator and the series regulator according to the present embodiment. As evidenced by FIG. 8, according to the efficiency characteristics of the switching regulator 20, when the consumption current is less than a predetermined value, the efficiency increases with an increase in consumption current, but is saturated in the range in which the consumption current is equal to or greater than the predetermined value; according to the efficiency characteristics of the series regulator 21, the efficiency has a certain value without regard to variations in consumption current. The linear regulator 22 has efficiency characteristics similar to those of the series regulator 21. The power source system 1 including the switching regulator 20 and series regulator 21 having different efficiency characteristics is thereby provided with efficiency characteristics complemented to one another.

It is to be noted that three or more power source terminals and three or more voltage converting units may be provided.

Referring to FIG. 2, there is illustrated a configuration including four power source terminals 3, 4, 11, and 12, and three voltage converting units 6, 7, and 13. The presence of more power source terminals and more voltage converting units forms more combinations of power-supplying channels, and the supply of the electrical power is controlled within fine limits.

The following discusses the control unit 9.

The control unit 9 has control of a selection to be made by each of the power source terminal-selecting unit 5 and the voltage converting unit-selecting unit 8. The power source terminal-selecting unit 5 selects either one of the power source terminals 3, 4. The voltage converting unit-selecting unit 8 selects either one of the voltage converting units 6, 7. Alternatively, the voltage converting unit-selecting unit 8 selects either the first step-down voltage converting unit 16 or the second step-down voltage converting unit 17. As a further alternative, the voltage converting unit-selecting unit 8 selects either the switching regulator 20 or the series regulator 21. The control unit 9 sends out and generates a control signal for each of the above selective combinations.

For example, in the power source system 1 of FIG. 4, the control unit 9 generates four different selection control signals in accordance with four different selective combinations as discussed below. The control unit 9 sends out either one of the generated signals. More specifically, four different selection control signals are generated in accordance with four different selective combinations of: the power source terminal 3 and the first step-down voltage converting unit 16; the power source terminal 3 and the second step-down voltage converting unit 17; the power source terminal 4 and the first step-down voltage converting unit 16; and the power source terminal 4 and the second step-down voltage converting unit 17. Either one of the generated selection control signals is sent out of the control unit 9. Needless to say, more different selection control signals are available when three or more power source terminals and three or more voltage converting units are provided as illustrated in FIG. 2.

The selection control signal is generated based on measured consumption current in the load circuit 10 or otherwise a quantity of loads imposed on processing activities of the load circuit 10. Alternatively, the selection control signal is generated in response to user input from the outside. The control unit 9 may optionally be implemented by a programmably operable processor, and in this option, the selection control signal is generated by input from the outside or otherwise by any predetermined program.

As a yet further alternative, the control unit 9 generates the selection control signal in accordance with a course of action provided by the load circuit 10.

For example, according to the course of action, assume that when the load circuit 10 is started to operate, a small consumption current flows in the load circuit 10, but the consumption current increases to the greatest extent before ultimately decreasing. Based on the assumption, the control unit 9 sends out and generates each of the selection control signals in accordance with the course of action as discussed above.

The control unit 9 determines each optimum combination of either one of the plural power source terminals and either one of the plural voltage converting units based on information on the consumption current in the load circuit 10. The control unit 9 feeds the determined results as the selection control signals into both of the power source terminal-selecting unit 5 and the voltage converting unit-selecting unit 8. In accordance with each of the selection control signals, the power source terminal-selecting unit 5 and the voltage converting unit-selecting unit 8 select, in practice, either one of the power source terminals and either one of the voltage converting units, respectively. As a result, a power-supplying channel is formed. The load circuit 11 is supplied with the electrical power through the formed power-supplying channel.

The consumption current-related information used by the control unit 9 as discussed above is varied, depending upon the structure of the load circuit 10 and a type of an electronic apparatus having the load circuit 10 provided therein.

The following discusses the power source terminal-selecting unit 5 and the voltage converting unit-selecting unit 8.

The power source terminal-selecting unit 5 selects either one of the power source terminals 3, 4, and then connects the selected power source terminal either 3 or 4 to the power source terminal-selecting unit 5 at the output terminal thereof. The power source terminal 3 differs in output voltage from the power source terminal 4. The power source terminal 3 is higher in output voltage than the power source terminal 4. For example, when the load circuit 10 requires a high output voltage because of increased consumption current in the load circuit 10, the power source terminal-selecting unit 5 selects the power source terminal 3. At this time, the power source terminal-selecting unit 5 selects the power source terminal 3 in accordance with the control signal sent out from the control unit 9.

The voltage converting unit-selecting unit 8 selects either one of the plural voltage converting units 6, 7 in accordance with the control signal from the control unit 9. Alternatively, in the power source system 1 of FIG. 4, the voltage converting unit-selecting unit 8 selects either the first step-down voltage converting unit 16 or the second step-down voltage converting unit 17. As a further alternative, in the power source system 1 of FIG. 6, the voltage converting unit-selecting unit 8 selects either the switching regulator 20 or the series regulator 21. In the power source system 1 of FIG. 7, the voltage converting unit-selecting unit 8 selects either the switching regulator 20 or the linear regulator 22.

Similarly to the switching regulator 20 and series regulator 21, the plural voltage converting units differ in efficiency characteristics from each other. The power source terminal 3 differs in output voltage from the power source terminal 4. As a result, the load circuit 10 is supplied with different values of the electrical power, depending upon a type of each combination of either one of the power source terminals and either one of the voltage converting units. This feature allows the power source system 1 to supply the load circuit 10 with the electrical power in response to variations in consumption current in the load circuit 10.

Alternatively, the voltage converting unit-selecting unit 8 may select the output from either the voltage converting unit 6 or the voltage converting unit 7, thereby feeding the selected output into the load circuit 10. As a further alternative, the voltage converting unit-selecting unit 8 may deactivate either one of the voltage converting units 6, 7 to allow only the other voltage converting unit to remain operative. In the latter alternative, the control signal from the voltage converting unit-selecting unit 8 enters each of the voltage converting units through an enable terminal thereof, thereby switching over each of the voltage converting units between operative and inoperative modes.

The power source terminal-selecting unit 5, voltage converting unit-selecting unit 8, and control unit 9 may be provided separately as illustrated in FIG. 1, or alternatively all or part of them may be formed by the same circuit or otherwise the same apparatus. As a further alternative, all or part of the power source terminal-selecting unit 5, control unit 9, voltage converting unit-selecting unit 8, and voltage converting units 6, 7 may be formed by an integrated circuit such as an IC and a LSI. In the latter alternative, a more downsized and thinner power source system 1 is available.

The power source terminal-selecting unit 5 may be either one of a selector, a multiplexer, and a transistor switch.

The following discusses, with reference to FIG. 6, a course of action provided by the power source system 1.

The power source terminal 3 disposed in the power-supplying source 2 is higher in output voltage than the power source terminal 4 similarly positioned therein. The switching regulator 20 and series regulator 21 are provided as the voltage converting units. Referring to FIG. 8, each of the switching regulator 20 and the series regulator 21 is shown exhibiting individual efficiency characteristics relative to the consumption current. When the series regulator 21 is replaced by the linear regulator 22, the linear regulator 22 has substantially the same efficiency characteristics as that of the series regulator 21.

The control unit 9 receives the information on the consumption current in the load circuit 10. For example, the control unit 9 is in receipt of results from the measurement of the consumption current in the load circuit 10. Based on the information on the consumption current in the load circuit 10, the control unit 9 generates a selection control signal indicative of a selection to be made by each of the power source terminal-selecting unit 5 and the voltage converting unit-selecting unit 8.

More specifically, when a very small consumption current is present in the load circuit 10, the control unit 9 generates a selection control signal to select both of the power source terminal 4 having a lower output voltage, and the series regulator 21 (or otherwise the linear regulator 22) that provides better efficiency characteristics relative to a smaller consumption current. The selection thus made provides reduced unwanted power consumption in each of the load circuit 10 and the switching regulator 20.

When an increased consumption current flows in the load circuit 10, the control unit 9 generates a selection control signal to select both of the power source terminal 3 having a higher output voltage, and the series regulator 21 (or otherwise the linear regulator 22). When a more increased consumption current flows in the load circuit 10, the control unit 9 generates a selection control signal to select the power source terminal 3 and the switching regulator 20. The selections thus made allow sufficient electrical power to be supplied to the load circuit 10 having the increased consumption current, whereby the load circuit 10 is operated without the occurrence of errors.

As described above, each proper combination of either one of the plural power source terminals having different output voltages and either one of the plural voltage converting units having different efficiency characteristics is made in accordance with the consumption current in the load circuit 10, whereby unwanted power consumption is reduced in the power source system, and the electronic apparatus is operated for a longer period of time. Furthermore, the load circuit 10 is operated without the occurrence of errors.

As a result, an electronic apparatus with improved usability and reliability is available.

Second Embodiment

A power source system 1 according to a second embodiment is now described with reference to FIGS. 9 and 10. In the power source system 1 as discussed below in the present embodiment, a control unit 9 measures consumption current in a load circuit 10 before executing selection control.

Figure 9:
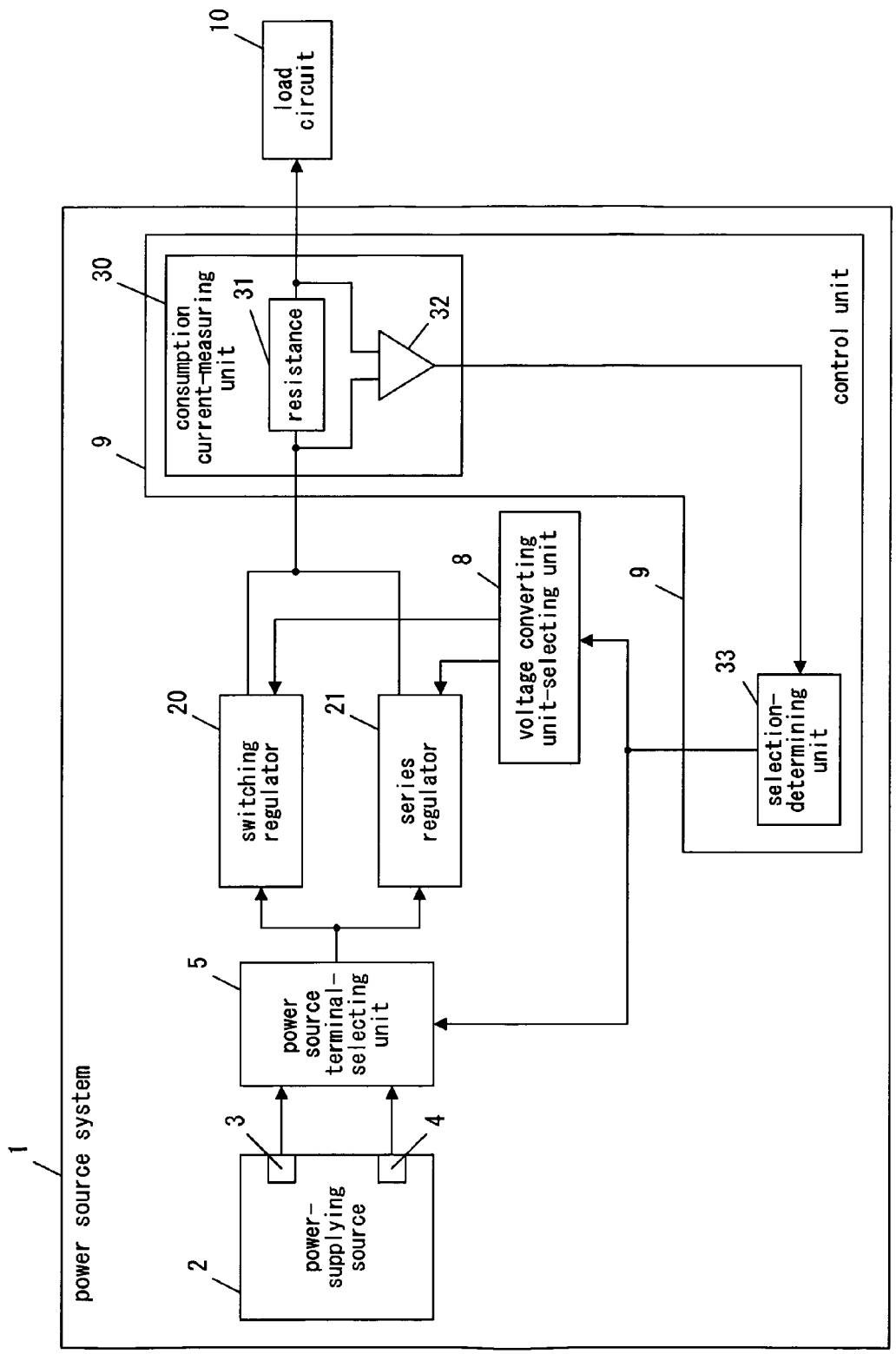
FIG. 9 is a block diagram illustrating a power source system according to a second embodiment.

FIG. 9 is a block diagram illustrating the power source system according to the present embodiment. FIG. 10 is an illustration showing efficiency characteristics of each of a switching regulator and a series regulator according to the present embodiment.

Figure 10:
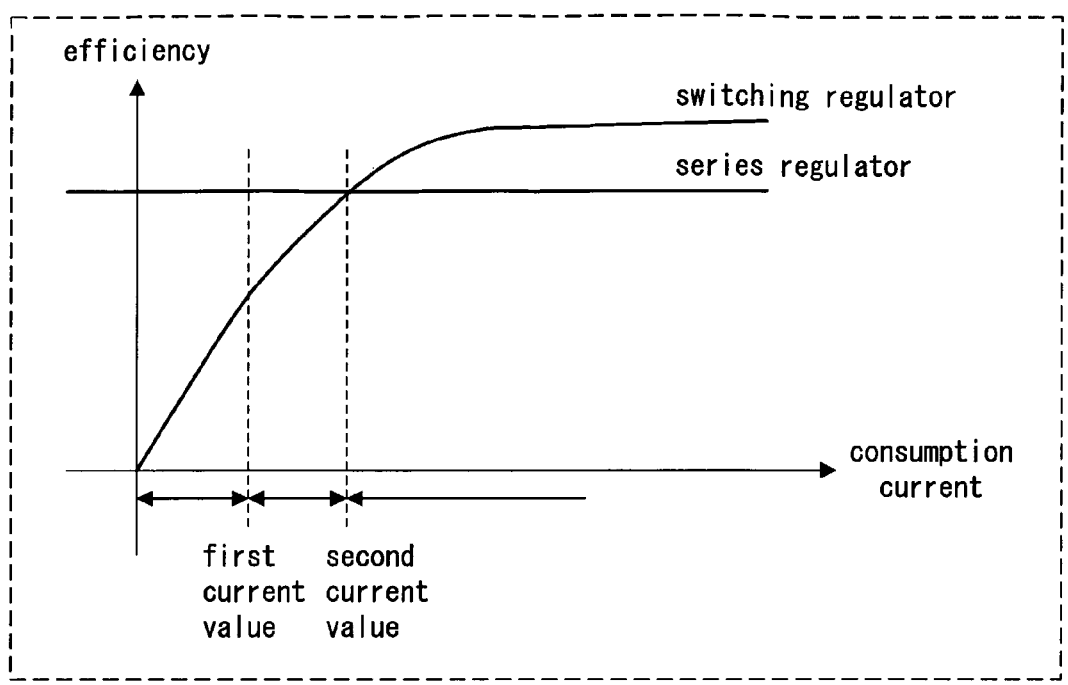
FIG. 10 is an illustration showing efficiency characteristics of each of a switching regulator and a series regulator according to the second embodiment.

The switching regulator 20 is illustrated as an exemplified voltage converting unit, and may alternatively be replaced by another voltage converting unit or otherwise a step-down voltage converting unit, each of which has efficiency characteristics as illustrated in FIG. 10 in which the efficiency varies with the consumption current. Similarly, the series regulator 21 is illustrated as an exemplified voltage converting unit, and may alternatively be replaced by another voltage converting unit or otherwise a step-down voltage converting unit, each of which has efficiency characteristics of FIG. 10 in which the efficiency remains substantially at a certain value regardless of variations in consumption current. As a further alternative, the series regulator 21 may be replaced by a linear regulator 22.

As a yet further alternative, there may be used another voltage converting unit or otherwise another step-down voltage converting unit, each of which differs in efficiency characteristics from the above. In addition, three or more voltage converting units may be used. The two different power source terminals of FIG. 9 may be replaced by three or more power source terminals.

In the power source system of FIG. 9, the control unit 9 includes a consumption current-measuring unit 30. Based on results from the measurement made by the consumption current-measuring unit 30, the control unit 9 determines a selection to be made by each of the power source terminal-selecting unit 5 and the voltage converting unit-selecting unit 8.

The consumption current-measuring unit 30 is operable to measure the consumption current flowing in the load circuit 10. A resistance 31 is provided in a pathway connected to the load circuit 10. An element 32 is connected to the resistance 31 at input and output terminals thereof. The connected element 32 measures electrical current flowing through the resistance 31. A value of the electrical current flowing through the resistance 31 corresponds to a value of the consumption current in the load circuit 10, and the consumption current-measuring unit 30 measures the consumption current in the load circuit 10.

The result of the measured current value is sent out to a selection-determining unit 33. The selection-determining unit 33 is operable to feed a selection control signal into each of the power source terminal-selecting unit 5 and the voltage converting unit-selecting unit 8 based on the incoming result from the measurement of the consumption current. At this time, a comparison is made between the measurement result and a predetermined threshold, and, based on results from the comparison, a combination of either one of the power source terminals and either one of the voltage converting units is determined. The selection-determining unit 33, which is a block capable of sending out and generating the selection control signal, may be either an independent block or part of the control unit 9.

The following discusses, with reference to FIG. 10, how a selection is made based on results from the measurement made by the consumption current-measuring unit 30. First and second current values determined as thresholds are set to compare the consumption current therewith. The second current value is positioned near an intersection at which one efficiency curve of the switching regulator 20 intersects another of the series regulator 21. The first current value is positioned at a position where the first current value is lower in current value than the second current value.

When a consumption current value measured by the consumption current-measuring unit 30 is less than the first current value, the load circuit 10 requires a small level of electrical power, and the power source terminal 4 having a lower output voltage is selected. In the current range less than the first current value, the series regulator 21 is higher in efficiency characteristics than the switching regulator 20, and the series regulator 21 is selected.

The selection thus made allows the power source system 1 to consume less unwanted electrical power.

When the measured consumption current value is equal to or greater than the first current value, but is less than the second current value, the load circuit 10 requires an intermediate level of electrical power, and the power source terminal 3 having a higher output voltage is selected. In the range of being equal to or greater than the first current value, but being less than the second current value, the series regulator 21 is higher in efficiency characteristics than the switching regulator 20. Thus, the series regulator 21 or otherwise the linear regulator 22 is selected.

The selection thus made supplies the load circuit 10 with the electrical power in accordance with a value of the consumption current in the load circuit 10.

When the consumption current in the load circuit 10 is increased to an extent in which the result of the measurement made by the power consumption-measuring unit 30 is equal to or greater than the second current value, the load circuit 10 requires a high level of electrical power, and the power source terminal 3 having a higher output voltage is selected. In the range of being equal to or greater than the second current value, the switching regulator 20 is higher in efficiency characteristics than the series regulator 21, and the switching regulator 20 is selected.

The selection thus made supplies the load circuit 10 with sufficient electrical power. As a result, a drop in voltage is prevented, which otherwise would occurs because of the increased consumption current, and the load circuit 10 is operated without the occurrence of errors.

As described above, the control unit 9 includes the consumption current-measuring unit 30 operable to measure the consumption current in the load circuit 10, whereby reduced unwanted consumption current is achievable in the power source system 1, and the electronic apparatus is run for an extended period of time. Furthermore, the presence of the consumption current-measuring unit 30 prevents malfunction of the load circuit 10, which otherwise would occur as a result of an increased consumption current-caused drop in voltage. This means that ensured operating time of the electronic apparatus is balanced with improved reliability of the electronic apparatus in terms of electronic apparatus activities.

Third Embodiment

A power source system according to a third embodiment is now described with reference to FIGS. 11-13.

The power source system according to the present embodiment provides each controlled combination of either one of power source terminals and either one of voltage converting units in accordance with a course of action provided by a load circuit, to which electrical power is properly supplied from the power source system, thereby balancing ensured operating time of an electronic apparatus with reliability of the electronic apparatus in terms of electronic apparatus activities.

Figure 11:
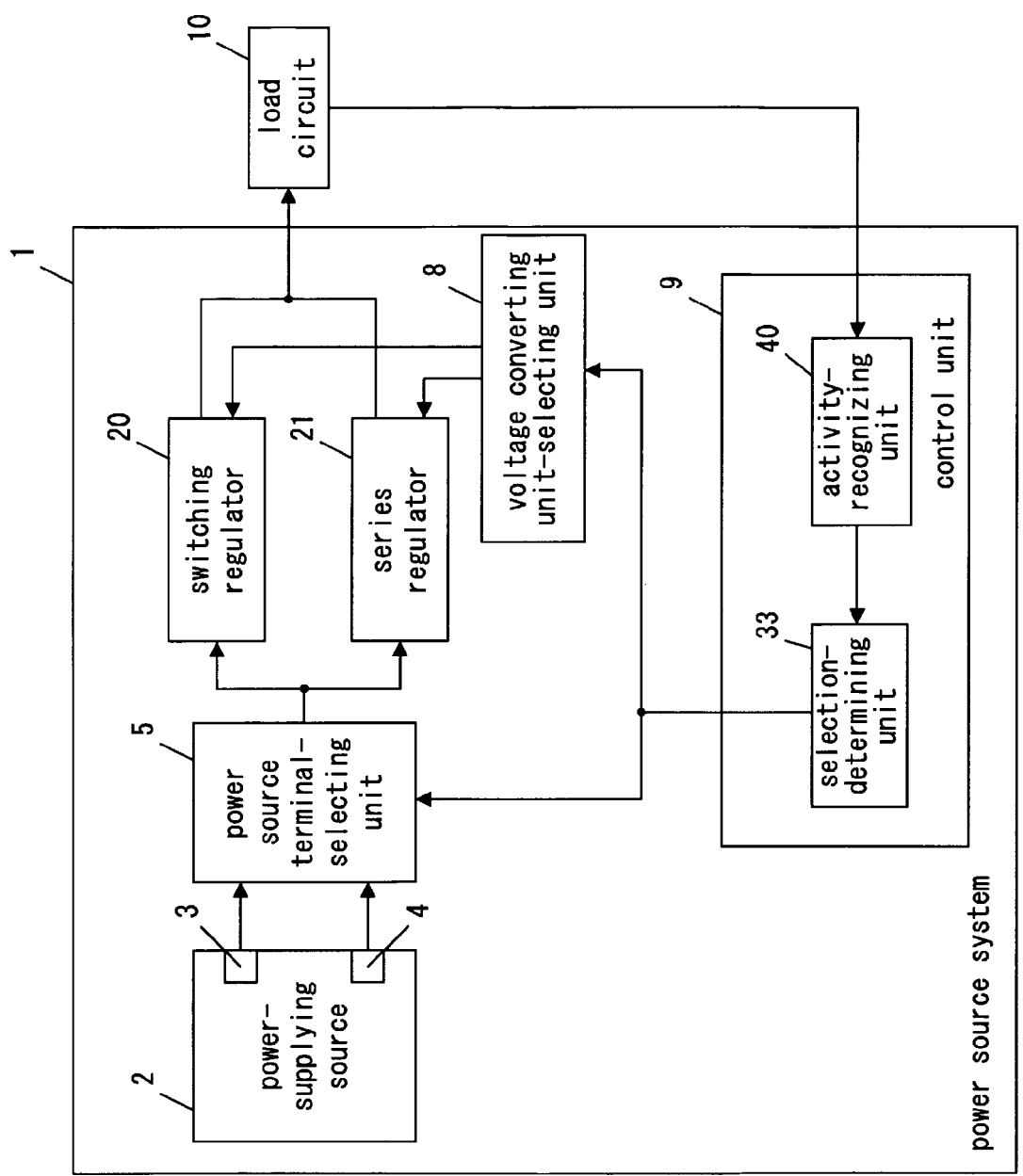
FIG. 11 is a block diagram illustrating a power source system according to a third embodiment.

FIG. 11 is a block diagram illustrating the power source system according to the present embodiment. Although a switching regulator 20 and a series regulator 21 are illustrated as exemplified voltage converting units, other voltage converting units may be substituted therefor, and plural voltage converting units different in efficiency characteristics from each other may alternatively be provided. The series regulator 21 may be replaced by a linear regulator 22.

Each of the switching regulator 20 and the series regulator 21 has efficiency characteristics as shown in FIG. 8. More specifically, according to the efficiency characteristics of the switching regulator 20, the efficiency increases with an increase in consumption current, but the increasing efficiency is saturated in the range in which the consumption current is equal to or greater than a certain value; according to the efficiency characteristics of the series regulator 21, the efficiency remains substantially at a certain value without regard to variations in the consumption current. The power source terminal 3 is higher in output voltage than the power source terminal 4.

As illustrated in FIG. 2, three or more power source terminals and three or more voltage converting units may be provided.

In the power source system 1 of FIG. 11, a control unit 9 includes an activity-recognizing unit 40 operable to recognize a type of each activity of the load circuit 10. The activity-recognizing unit 40 recognizes the activity types based on received information on the types of the activities performed in the load circuit 10. A variety of activities are executed in the load circuit 10, and when different activities are carried out therein, an interruption signal as well as a start signal indicative of start of each of the activities is sent out by the load circuit 10 to a processor having control of the activities of the load circuit 10. The activity-recognizing unit 40 monitors the start signal and the interruption signal, thereby recognizing types of the activities of the load circuit 10.

The activity-recognizing unit 40 determines required electrical power based on each of the recognized activity types. Based on results from the determination made by the activity-recognizing unit 40, the selection-determining unit 33 determines each combination of either one of the power source terminals and either one of the voltage converting units. A selection control signal including information on each of the determined combinations is sent out by the selection-determining unit 33 to both of the power source terminal-selecting unit 5 and the voltage converting unit-selecting unit 8.

For example, assume that the electronic apparatus is a notebook-sized personal computer, and that major activities carried out in the load circuit 10 includes three different activities of "keyboard-based key input", "character string editing", and "moving image reproduction". A small level of electrical power is required to execute the activity "keyboard-based key input". The activity "character string editing" is greater in required electrical power than the "keyboard-based key input", but is smaller therein than the "moving image reproduction". That is, the activity "moving image reproduction" requires the greatest level of electrical power.

Upon start of the activity "keyboard-based key input", a key input-indicating signal is generated by the load circuit 10. The activity-recognizing unit 40 monitors the signal, thereby recognizing a status of the activity "keyboard-based key input". At this time, a small level of electrical power is required to execute the activity "keyboard-based key input", and the activity-recognizing unit 40 instructs the selection-determining unit 33 to select the power source terminal 4 and the series regulator 21 to form a combination thereof. A power-supplying channel is formed by the combination of the power source terminal 4 having a lower output voltage and the series regulator 21 having higher efficiency characteristics in the range of a smaller consumption current. The formed power-supplying channel provides reduced unwanted power consumption in the power source system 1.

Upon start of the activity "character string editing", an interruption signal to activate editing software is generated by the load circuit 10. The activity-recognizing unit 40 monitors the interruption signal, thereby recognizing the start of the activity "character string editing". An intermediate level of electrical power is required to execute the activity "character string editing", and the activity-recognizing unit 40 instructs the selection-determining unit 33 to combine the power source terminal 4 with the series regulator 21. Upon receipt of the instructions, the selection-determining unit 33 sends out one selection control signal to the power source terminal-selecting unit 5 to select the power source terminal 3, and another selection control signal to the voltage converting unit-selecting unit 8 to select the series regulator 21.

Upon start of the activity "moving image reproduction", a signal related to a request from the outside is generated by the load circuit 10. The activity-recognizing unit 40 monitors the request signal, thereby recognizing the start of the activity "moving image reproduction". To execute the activity "moving image reproduction", the highest level of electrical power is required, and the activity-recognizing unit 40 instructs the selection-determining unit 33 to combine the power source terminal 3 with the switching regulator 20. In response to the instructions, the selection-determining unit 33 sends out one selection control signal to the power source terminal-selecting unit 5 to select the power source terminal 3, and another selection control signal to the voltage converting unit-selecting unit 8 to select the switching regulator 20. The control thus exercised forms a power-supplying channel that connects the power-supplying source 2 to the load circuit 10 through the interconnected power source terminal 3 and switching regulator 20. The formed power-supplying channel makes it feasible to supply sufficient electrical power for the activity "moving image reproduction" that requires a high value of electrical power. As a result, malfunction of the load circuit 10 is prevented, which otherwise would occur as a result of an increased consumption current-caused drop in voltage.

Figure 12:
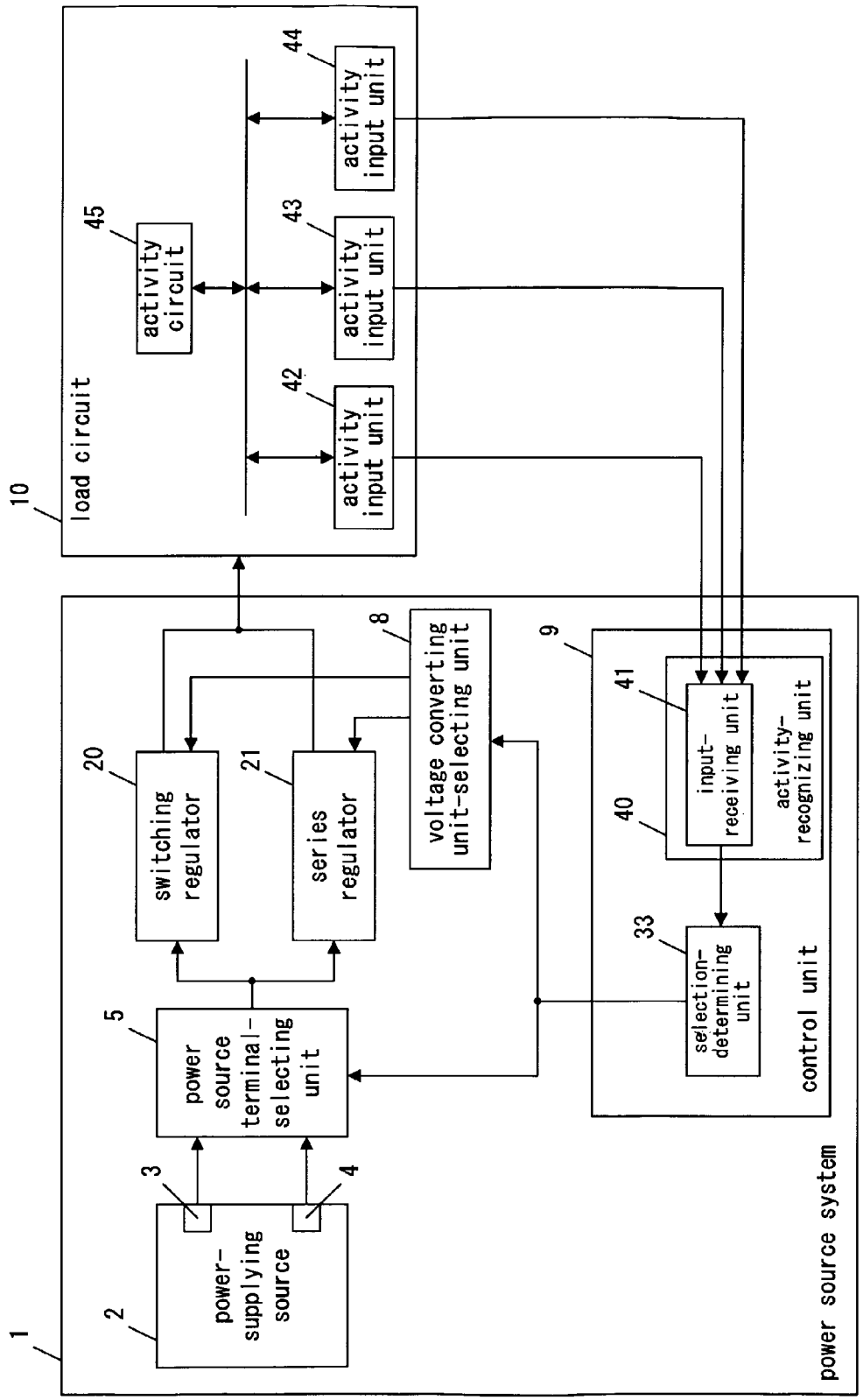
FIG. 12 is a block diagram illustrating another power source system according to the third embodiment.

The following discusses a differently configured power source system with reference to FIG. 12.

FIG. 12 is a block diagram illustrating the power source system according to the present embodiment. FIG. 12 illustrates add-ons as well as the elements of FIG. 11. The add-ons are: activity input units 42-44, each of which is operable to address an activity request to the load circuit 10; and an input-receiving unit 41 disposed in the activity-recognizing unit 40.

The load circuit 10 includes an activity circuit 45, to which the activity request is addressed in response to a request from the outside or from a program. The request includes, e.g., a request made by key input from the outside, and an interruption request made by an internal program. In response to such requests, each of the activity input units 42-44 addresses an activity request to the activity circuit 45.

For example, the activity input unit 42 addresses the activity request to the activity circuit 45 in accordance with the key input from the outside; the activity input unit 43 does the same, but in accordance with an interruption from a program; and the activity input unit 44 does the same, but in accordance with an error generation signal. The electrical power required by the activity circuit 45 in response to these activity requests is varied, depending upon each of the activities.

The input-receiving unit 41 receives, together with the activity circuit 45, a request signal sent out from each of the activity input units 42-44, and then recognizes electrical power required by the activity circuit 45. For example, a lower lever of electrical power is required to operate the activity circuit 45 in response to a request from the activity input unit 42, while a higher level of electrical power is required to operate the activity circuit 45 in response to a request from the activity input unit 44. The input-receiving unit 41 determines the required electrical power based on each of the signals from the activity input units 42-44.

The selection-determining unit 33 determines each combination of either one of the power source terminals and either one of the voltage converting units, and sends out each of the determined results as a selection control signal to both of the power source terminal-selecting unit 5 and the voltage converting unit-selecting unit 8.

The selection thus made allows the power source system 1 to efficiently supply the load circuit 10 with the required electrical power, thereby providing reduced unwanted power consumption in the power source system 1. In addition, the load circuit 10 thus supplied with the sufficient electrical power is operated without the occurrence of errors.

The power source terminals 3, 4, switching regulator 20, and series regulator 21 are selected in a manner similar to that as described with reference to FIG. 11. The switching regulator 20 and series regulator 21 are illustrated as exemplified voltage converting units, and may alternatively be replaced by other elements. The series regulator 21 may be replaced by a linear regulator 22. As illustrated in FIG. 2, three or more power source terminals and three or more voltage converting units may be provided.

Figure 13:
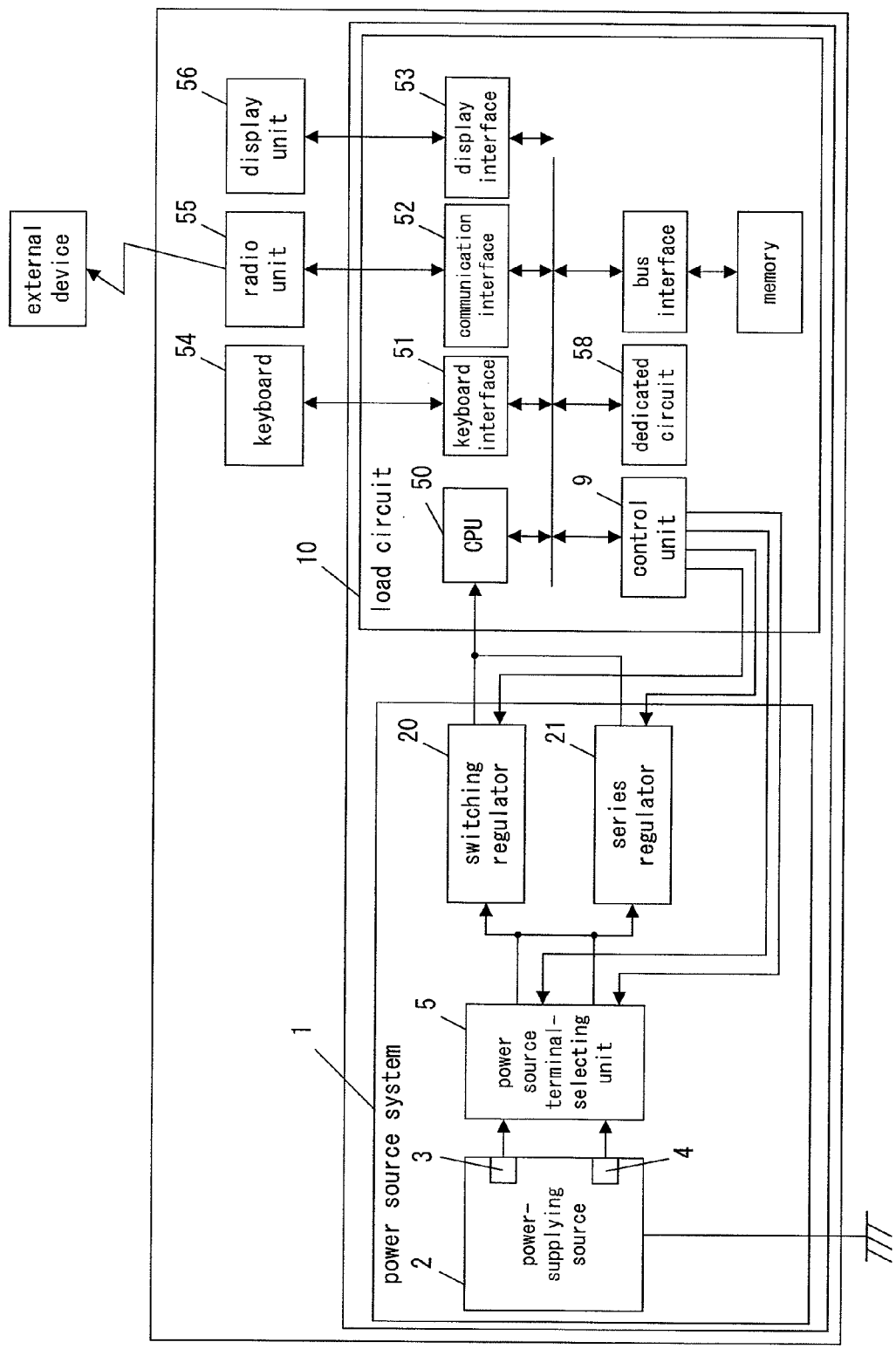
FIG. 13 is a block diagram illustrating an electronic apparatus according to the third embodiment.

The following discusses a further differently configured power source system with reference to FIG. 13. FIG. 13 is a block diagram illustrating an electronic apparatus according to the present embodiment. Referring to FIG. 13, the electronic apparatus is illustrated having the power source system integrally incorporated therein. A control unit 9 is combined integrally into a load circuit 10.

In the power source system 1 of FIG. 13, the control unit 9 recognizes an activity type in response to activity input from an external or internal program, thereby selecting a power-supplying combination of either one of power source terminals and either one of voltage converting units in accordance with the recognized activity type.

The load circuit 10 includes a keyboard interface 51 operable to receive an activity request from the outside, a communication interface 52, a display interface 53, a processor 50 having control of the entire elements, the control unit 9, and a dedicated circuit 58. The load circuit 10 further includes a bus interface and a memory controller, when necessary.

Each of a keyboard 54, a radio unit 55, and a display unit 56 is a block operable to fulfill the activity request from the outside. The keyboard interface 51 receives an activity request via the keyboard 54. The communication interface 52 receives another activity request from the radio unit 55. The display interface 53 receives a further activity request from the display unit 56.

The keyboard interface 51 in receipt of the activity request feeds a receipt signal into the control unit 9. Based on the receipt signal, the control unit 9 recognizes a course of action to be provided by the load circuit 10. The control unit 9 determines required electrical power based on the recognized course of action, thereby determining a selection of both an optimum power source terminal and an optimum voltage converting unit.

When determining that a lower level of electrical power is required, then the control unit 9 selects the power source terminal 4 having a lower output voltage, and the series regulator 21. The selection thus made provides reduced unwanted power consumption in each of the power source system 1 and the load circuit 10.

When determining that an intermediate level of electrical power is required, then the control unit 9 selects the power source terminal 3 having a higher output voltage, and the series regulator 21. The selection thus made provides the proper supply of the electrical power without a drop in voltage and without the occurrence of excessive power consumption.

When determining that a higher level of electrical power is required, then the control unit 9 selects the power source terminal 3 and the switching regulator 20. The selection thus made provides the supply of the electrical power without a drop in voltage, and prevents malfunction of the load circuit 10.

As described above, optimum power-supplying channels are selected based on the request signal or otherwise interruption signal sent out by the interface in response to external input, whereby the electronic apparatus is operated for an extended period of time with increased reliability of the electronic apparatus in terms of electronic apparatus activities.

It is also desirable that the supply of the electrical power is controlled based on a variety of activity requests such as audio output or data recording, apart from the activity requests addressed by the interfaces in response to the external input as shown in FIG. 13. The presence of more power source terminals and more voltage converting units provides more power-supplying channels, thereby realizing the supply of the electrical power in accordance with each activity type; however, an increased number of the power-supplying channels must be balanced with the scale of the circuit in the power source system 1.

As described above, according to the present embodiment, the electrical power required by the load circuit 10 is easily estimated based on the recognized type of each of the activities of the load circuit 10, and appropriate power-supplying channels are formed in accordance with the estimated electrical power.

In the power source system that provides an activity type-based switchover of the electrical power to be supplied, a course of processing to estimate the required electrical power based on each of the activity types may be set up in advance or may programmably be set up. The control unit 9 desirably includes a table showing a relationship between the required electrical power and the power-supplying channels. Based on the table, either one of the power-supplying channels is easily determined. It is also desirable that the above table is replaced by a posterior rewritable table.

The following discusses how the power source systems 1 according to the first to third embodiments are applied to an electronic apparatus.

The electronic apparatus as hereinafter discussed desirably includes a handheld terminal and a notebook-sized personal computer.

Figure 14:
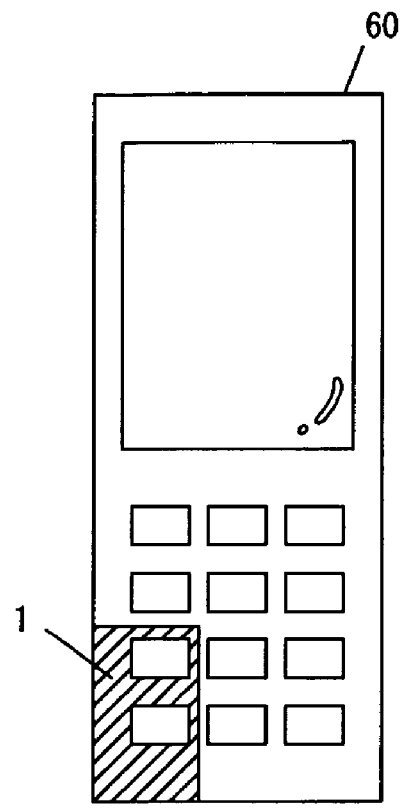
FIG. 14 is a front view illustrating a handheld terminal according to the third embodiment.
Figure 15:
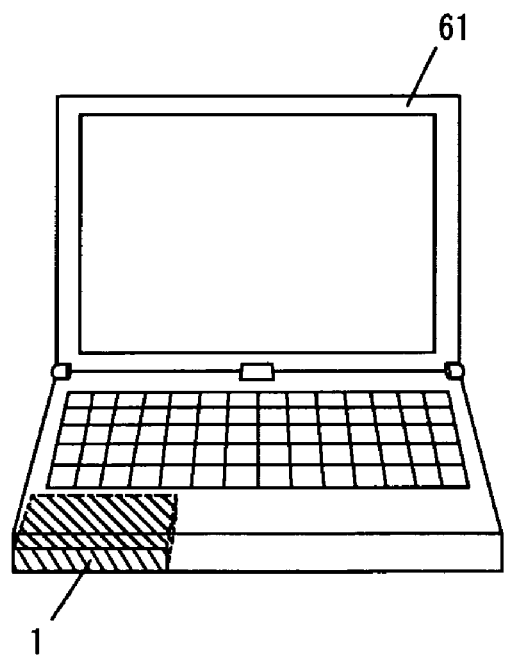
FIG. 15 is a perspective view illustrating a notebook-sized personal computer according to the third embodiment.
Figure 16:
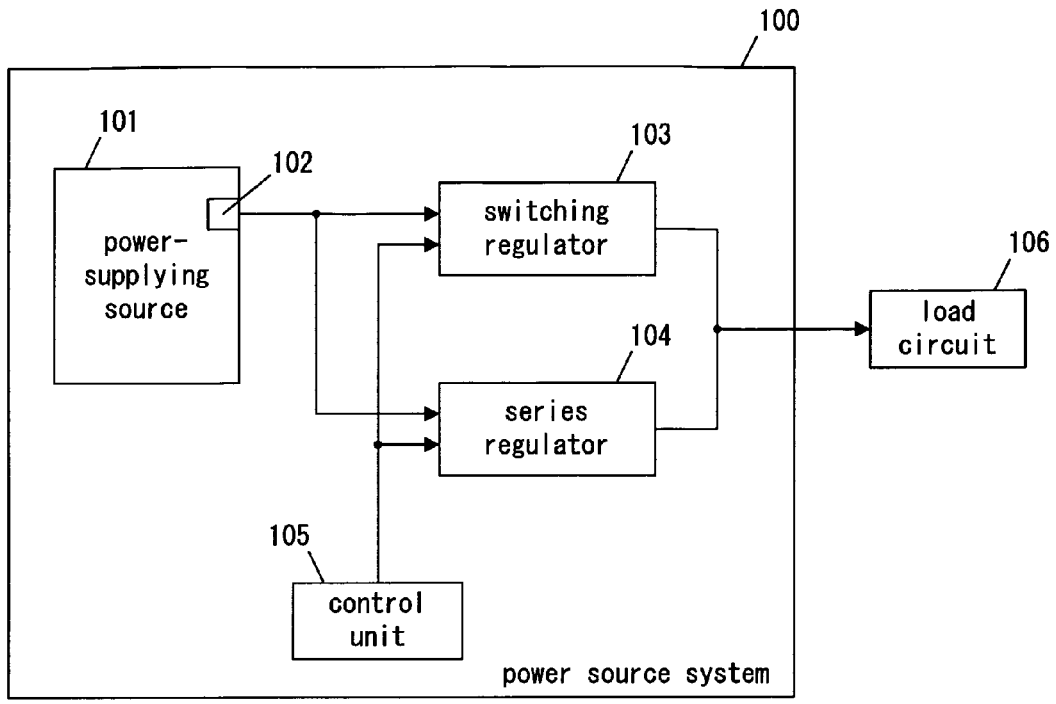
FIG. 16 is a block diagram illustrating a prior art power source system.
Figure 17:
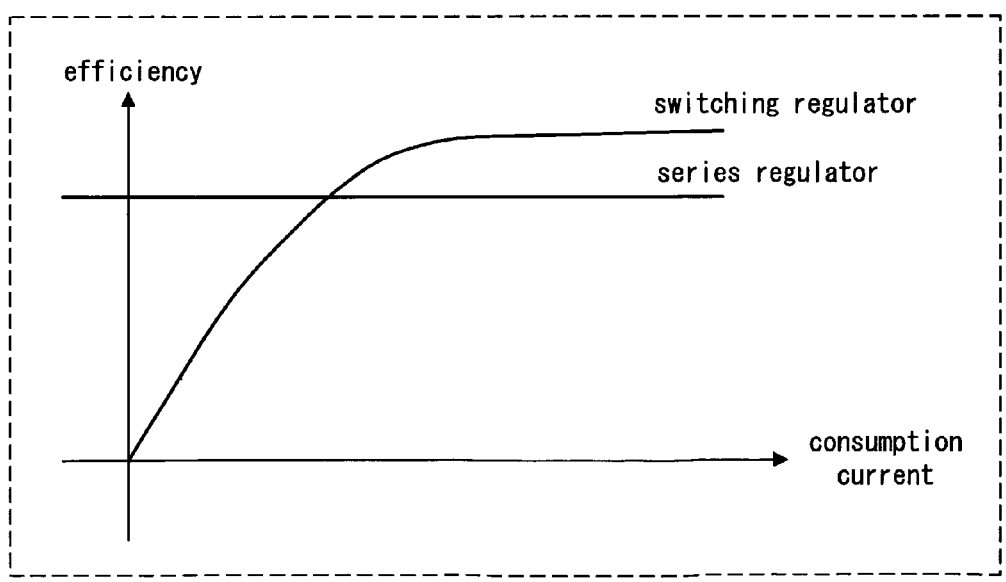
FIG. 17 is an illustration showing efficiency characteristics of each of a switching regulator and a series regulator.

FIG. 14 is a front view illustrating the handheld terminal according to the present embodiment. FIG. 15 is a perspective view illustrating the notebook-sized personal computer according to the present embodiment.

The handheld terminal 60 of FIG. 14 is a cellular phone or a PDA. The handheld terminal 60 houses a battery-containing power source system 1 to ensure the portability of the handheld terminal 60. The handheld terminal 60 is provided with functions such as key input processing, communicating activities, mailing, content downloading, and static image/moving image-reproducing and -displaying activities. Each of these activities requires a different value of electrical power, and the required electrical power is determined based on measured consumption current or otherwise information on a recognized type of each of the activities. The required power thus determined is supplied through a power-supplying channel formed by each combination of either one of plural power source terminals and either one of plural voltage converting units.

Similarly, the notebook-sized personal computer 61 of FIG. 15 houses the power source system 1. The notebook-sized personal computer 61 is provided with functions such as character string editing, audio/image reproduction, and internet connection. Each of these functions requires a different value of electrical power, and the required power is determined based on measured consumption current or otherwise information on a recognized type of each activity. The required power thus determined is supplied through a power-supplying channel formed by each combination of either one of plural power source terminals and either one of plural voltage converting units.

The electronic apparatus such as the handheld terminal 60 housing the power source terminal 1 and the notebook-sized personal computer 61 housing the power source system 1 is operable for a longer period of time with improved reliability of the electronic apparatus in terms of electronic apparatus activities.

As described above, the power source system according to the present embodiment brings the optimum supply of the electrical power to the electronic apparatus in accordance of a recognized type of each activity in the electronic apparatus. The optimum supply of the electrical power provides reduced unwanted power consumption of the power source system, and prevents voltage drop-caused malfunction of the load circuit. As a result, prolonged operating time of the electronic apparatus is balanced with improved reliability of the electronic apparatus in terms of electronic apparatus activities.

For a fuel cell, a drop in voltage is likely to occur when the consumption current increases. The power source system according to the present invention copes with the voltage drop, and an optimum power source system is fabricated in fuel cell-based electronic apparatuses.

Pursuant to the present invention, a power-supplying channel taking into consideration the magnitude of the consumption current in the load circuit is formed by each combination of either one of plural power source terminals having different output voltages, and either one of plural voltage converting units having different efficiency characteristics, in which the power source terminals are disposed in the battery-based power-supplying source. Each of the formed power-supplying channels provides the supply of the electrical power in accordance with the magnitude of the required electrical power.

The supply of the electrical power based on the required power provides reduced unwanted power consumption in the power source system 1. The reduced power consumption provides a longer period of operating time of the electronic apparatus and increased usability of the handheld type electronic apparatus.

In addition, the reduced power consumption provides the downsized power-supplying source 2, and provides improved portability of the electronic apparatus.

Furthermore, the supply of the electrical power based on the required electrical power prevents a drop in voltage, which otherwise would occurs as a result of increased consumption current, and prevents malfunction of the load circuit 10.

The power consumption-reducing and malfunction-proof features as discussed above balance a longer period of operating time of the electronic apparatus with improved reliability of the electronic apparatus in terms of electronic apparatus activities.

The beneficial effects as discussed above are operative in electronic apparatuses provided with significantly extended functions of late.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The present invention finds desirable applications in the field of, e.g., a power source system disposed in an electronic apparatus such as, e.g., a handheld terminal and a notebook-sized personal computer, in which the power source system provides a longer period of operating time of the electronic apparatus and improved reliability of the electronic apparatus in terms of electronic apparatus activities.

The invention claimed is:

1. A power source system operable to supply a load circuit with electrical power, said power source system comprising:
   a power-supplying source comprising a plurality of power source terminals that differ in output voltage from each other, said power-supplying source being operable to supply the electrical power through said plurality of power source terminals;
   a power source terminal-selecting unit operable to select one of said plurality of power source terminals;
   a plurality of voltage converting units connected to said power source terminal-selecting unit, said plurality of voltage converting units being operable to convert electrical voltage;
   a voltage converting unit-selecting unit operable to select one of said plurality of voltage converting units; and
   a control unit operable to control a selection to be made by each of said power source terminal-selecting unit and said voltage converting unit-selecting unit,
   wherein said control unit comprises a consumption value-measuring unit operable to measure a consumption value in the load circuit, and to provide a measurement result, and wherein based on the measurement result, said control unit exercises control over a selection to be made by each of said power source terminal-selecting unit and said voltage converting unit-selecting unit.

2. A power source system as defined in claim 1, wherein said consumption value-measuring unit measures consumption current in the load circuit as the consumption value.

3. A power source system as defined in claim 2, wherein said control unit comprises an activity-recognizing unit operable to recognize a type of each activity of the load circuit and provide a recognized activity type, and wherein based on the recognized activity type, said control unit exercises control over a selection to be made by each of said power source terminal-selecting unit and said voltage converting unit-selecting unit.

4. A power source system as defined in claim 3, wherein said activity-recognizing unit comprises an input-receiving unit operable to receive activity input and provide a result from receipt of the activity input, and wherein based on the result from the receipt of the activity input, said control unit exercises control over a selection to be made by each of said power source terminal-selecting unit and said voltage converting unit-selecting unit.

5. A power source system as defined in claim 1, wherein said power-supplying source includes a rechargeable battery.

6. A power source system as defined in claim 1, wherein said power-supplying source includes a fuel cell.

7. A power source system as defined in claim 1, wherein said power-supplying source comprises a plurality of internal power source cells serially connected together, and wherein said plurality of power source terminals are connected to said plurality of internal power source cells at different connections of said plurality of internal power source cells.

8. A power source system as defined in claim 7, wherein said plurality of internal power source cells comprises an internal power source cell connected to a higher voltage side of said power-supplying source, and an internal power source cell connected to a lower voltage side of said power-supplying source, and wherein said internal power source cell connected to the higher voltage side is smaller in size than said internal power source cell connected to the lower voltage side.

9. A power source system as defined in claim 1, wherein said plurality of voltage converting units comprises a plurality of step-down voltage converting units, each of said plurality of step-down voltage converting units being operable to lower output voltage relative to input voltage, and said plurality of step-down voltage converting units being different in efficiency characteristics from each other relative to consumption current.

10. A power source system as defined in claim 9, wherein said plurality of step-down voltage converting units comprises one step-down voltage converting unit having efficiency characteristics dependent upon the consumption current, and another step-down voltage converting unit having efficiency characteristics independent of the consumption current.

11. A power source system as defined in claim 9, wherein said plurality of step-down voltage converting units comprise a switching regulator and a series regulator.

12. A power source system as defined in claim 9, wherein said plurality of step-down voltage converting units comprise a switching regulator and a linear regulator.

13. A power source system operable to supply a load circuit with electrical power, said power source system comprising:

a power-supplying source comprising a first power source terminal and a second power source terminal, said first power source terminal being different in output voltage from said second power source terminal, said power-supplying source being operable to supply the electrical power through said first power source terminal and said second power source terminal;

a power source terminal-selecting unit operable to select one of said first power source terminal and said second power source terminal;

a switching regulator and a series regulator, both of which are connected to said power source terminal-selecting unit;

a voltage converting unit-selecting unit operable to select one of said switching regulator and said series regulator; and a control unit operable to control a selection to be made by each of said power source terminal-selecting unit and said voltage converting unit-selecting unit, wherein said first power source terminal is higher in output voltage than said second power source terminal, wherein said control unit comprises a consumption value-measuring unit operable to measure a consumption value in the load circuit, and to provide a result from measurement of the consumption value, wherein when the result from the measurement of the consumption value is less than a first value, said control unit sends out one control signal to said power source terminal-selecting unit to select said second power source terminal, and another control signal to said voltage converting unit-selecting unit to select said series regulator, wherein when the result from the measurement of the consumption current is equal to or greater than the first value, but is smaller than a second value, said control unit sends out one control signal to said power source terminal-selecting unit to select said first power source terminal, and another control signal to said voltage converting unit-selecting unit to select said series regulator, and wherein when the result from the measurement of the consumption value is equal to or greater than the second value, said control unit sends out one control signal to said power source terminal-selecting unit to select said first power source terminal, and another control signal to said voltage converting unit-selecting unit to select said switching regulator.

14. A power source system as defined in claim 13, wherein said consumption value measuring unit measures consumption current in the load circuit as the consumption value.

15. An electronic apparatus comprising:

a central processing unit;

a power-supplying source comprising a plurality of power source terminals that differ in output voltage from each other, said power-supplying source being operable to supply a load circuit with electrical power through said plurality of power source terminals;

a power source terminal-selecting unit operable to select one of outputs of said plurality of power source terminals;

a plurality of voltage converting units connected to said power source terminal-selecting unit at an output terminal of said power source terminal-selecting unit, said plurality of voltage converting units being operable to convert electrical voltage;

a voltage converting unit-selecting unit operable to select one of said plurality of voltage converting units; and a control unit operable to control a selection to be made by each of said power source terminal-selecting unit and said voltage converting unit-selecting unit, wherein said control unit comprises a consumption value-measuring unit operable to measure a consumption value in the load circuit, and to provide a result from measurement of the consumption value, wherein when the result from the measurement of the consumption value is less than a first value, said control unit sends out one control signal to said power source terminal-selecting unit to select said second power source terminal, and another control signal to said voltage converting unit-selecting unit to select said series regulator, wherein when the result from the measurement of the consumption current is equal to or greater than the first value, but is smaller than a second value, said control unit sends out one control signal to said power source terminal-selecting unit to select said first power source terminal, and another control signal to said voltage converting unit-selecting unit to select said series regulator, and wherein when the result from the measurement of the consumption value is equal to or greater than the second value, said control unit sends out one control signal to said power source terminal-selecting unit to select said first power source terminal, and another control signal to said voltage converting unit-selecting unit to select said switching regulator.

16. An electronic apparatus as defined in claim 15, wherein said electronic apparatus is a handheld terminal.

17. An electronic apparatus as defined in claim 15, wherein said electronic apparatus is a notebook-sized personal computer.

18. An electronic apparatus as defined in claim 15, wherein said consumption value-measuring unit measures consumption current in the load circuit as the consumption value.

* * * * *